United States Patent
Tennent et al.

(10) Patent No.: US 6,414,836 B1
(45) Date of Patent: *Jul. 2, 2002

(54) ELECTROCHEMICAL CAPACITORS HAVING ELECTRODES WITH DIVERSE REDOX POTENTIALS

(75) Inventors: Howard Tennent, Kenneth Square; David Moy, Winchester; Chun-Ming Niu, Somerville, all of MA (US)

(73) Assignee: Hyperion Catalysis International, Inc, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/410,984

(22) Filed: Oct. 1, 1999

Related U.S. Application Data

(62) Division of application No. 08/856,657, filed on May 15, 1997, now Pat. No. 6,031,711.
(60) Provisional application No. 60/017,609, filed on May 15, 1996.

(51) Int. Cl.[7] .................................................. H01G 4/06
(52) U.S. Cl. ........................ 361/313; 361/511; 361/529; 361/303; 361/502; 361/528
(58) Field of Search .............................. 361/301.5, 511, 361/502, 503, 508, 589, 516, 524, 303, 313, 529, 528

(56) References Cited

U.S. PATENT DOCUMENTS

| | | |
|---|---|---|
| 3,638,086 A | 1/1972 | Rayburn et al. ............ 317/260 |
| 3,754,311 A | 8/1973 | Rayburn .................... 29/25.42 |
| 4,423,463 A | 12/1983 | Serradimigni ............... 361/275 |
| 4,496,637 A | 1/1985 | Shimada et al. .............. 429/44 |
| 4,562,511 A | 12/1985 | Nishino et al. ............. 361/324 |
| 4,835,074 A | 5/1989 | Bolster et al. ................ 429/43 |
| 5,082,594 A | 1/1992 | Tsuzuki et al. ............. 252/502 |
| 5,260,855 A * | 11/1993 | Kaschmitter et al. ........ 361/502 |
| 5,402,306 A * | 3/1995 | Mayer et al. ................ 361/502 |
| 5,621,607 A | 4/1997 | Farahmandi et al. ......... 361/502 |
| 5,626,977 A * | 5/1997 | Mayer et al. .................. 429/44 |
| 5,646,815 A * | 7/1997 | Owens et al. ................ 361/502 |
| 5,729,427 A * | 3/1998 | Li et al. ..................... 361/503 |
| 5,982,609 A | 11/1999 | Evans |
| 6,031,711 A * | 2/2000 | Tennent et al. .............. 361/303 |
| 6,205,016 B1 * | 3/2001 | Niu ............................ 361/503 |

OTHER PUBLICATIONS

An Electric Double–Layer Capacitor with Activated Carbon Fiber Electrodes, Akihiko Yoshida, IEEE Transactions on Components, Hybrids, and Manufacturing Technology vol. 10 CHMT–10, No. 1, Mar. 1987.

An Electric Double–Layer Capacitor with High Capacitance and Low Resistance, Akihiko Yoshida et al, IEEE Transactions on Components, Hybrids, and Manufacturing Technology, vol. 4, No. 1, Feb., 1992.

Large Capacitance Electric Double Layer Capacitor using Activated Carbon/Carbon Composite, Junji Tabuchi et al, IEEE Transaction on Components, Hybrids, and Manufacturing Technology, vol. 16, No. 4, Jun., 1993.

The Aerocapacitor: An Electrochemical Double–Layer Energy–Storage Device, S.T. Mayer, J. Electrochem., Society, Inc.

(List continued on next page.)

*Primary Examiner*—Dean A. Reichard
*Assistant Examiner*—Nguyen T Ha
(74) *Attorney, Agent, or Firm*—Kramer, Levin, Naftalis & Frankel LLP; Barry Evans, Esq.

(57) ABSTRACT

Graphitic nanofibers, which include tubular fullerenes (commonly called "buckytubes"), nanotubes and fibrils, which are functionalized by chemical substitution, are used as electrodes in electrochemical capacitors. The graphitic nanofiber based electrode increases the performance of the electrochemical capacitors.

16 Claims, 4 Drawing Sheets

OTHER PUBLICATIONS

Performance Evaluation of Polypyrrole and Polyaniline As Active Materials For Electrochemical Capacitors, A. Rudge et al, Electronics Research Group, Los Alamos National Laboratory, Los Alamos, New Mexico.

Techinical Status of High–Power Electrochemcial Capacitors, J. Miller, JME, Inc., Shake Heights, Ohio.

Design Fules and Reality Check for Carbon–Based Ultracapacitors, Sandia Report, E. Eisenmann, Apr. 1995.

Electrochemical Science and Technology, Transition from "Supercapacitor" to "Battery" Behavior in Electrochemical Energy Storage, B. Conway, J. Electrochem. Soc., vol. 138, No. 6, Jun. 1991.

The Evans Capattery, The Next Generation in Double–Layer Capacitors, Technical Papers 1989–1994, High Reliability Double Layer Capacitor, D.A. Evans.

Performance Characteristics of High Reliability Double Layer Capacitor Components, John R. Miller et al, $35^{th}$ International Power Sources Symposium, Jun. 22–25, 1992.

Capattery Double Layer Capacitor Life Performance, D.A. Evans, et al, $11^{th}$ Capacitor & Resistor Technology Symposium and published in Carts '91 Proceedings.

Electrochemical Capacitor Power Performance: Stability as a Function of Temperature Voltage and Operating Time, J;R; Miller, International Seminar on Double–Layer Capacitors and Similar Energy Storage Devices, Dec. 1993.

Gas Generation in Carbon Double–Layer Capacitors, D.A. Evans, International Sewminar on Double–Layer Capacitors and Similar Energy Storage Devices, Dec. 9–11, 1991.

Technical Status on High–Power Electrochemical Capacitors, J.R. Miller, $11^{th}$ International on Primary and Secondary Battery Technologies and Applications, 2–28–3–3, 94.

Xue et al., Electrical Double Layer Capacitor by Using B"–$Al_2O_3$ Containing Fine Carbon Particles as Electrolytes, *Solid State Ionics* 18 & 19 (1986) 1134–1138.

Selection and Application of Electrochemical Capacitors, John R. Miller.

Electrochemical Capacitor Voltage Balance: Cell Uniformity Requirements for High–Volttage Devices, John R. Miller, $36^{th}$ Power Sources Conference, Power Sources Divisional, Electronics & Power Sources Directorate, U.S. Army Research Laboratory, Cherry Hill, New Jersey, Jun. 6–9, 1994.

Performance of Hydrogen Uranyl Phosphate–Carbon Double–Layer Solid Capacitor, M. Pham–Thi et al.

A New Charge Storage Mechnism for Electrochemical Capacitors, J.P. Zheng et al., J. Electrochem. Soc. vol. 142, No. 1, Jan. 1995.

Forty Kilojoule Carbon Double Layer Capacitor, D. Evans, Dec. 6, 1993.

Supercapacitors Carbon–metal composite capacitors.

* cited by examiner

US 6,414,836 B1

ELECTROCHEMICAL CAPACITORS HAVING ELECTRODES WITH DIVERSE REDOX POTENTIALS

This is a divisional application under 37 CFR §1.53(b) of pending prior application Ser. No. 08/856,657, filed on May 15, 1997; now U.S. Pat. No. 6,031,711 by Howard Tennent et al., and currently entitled GRAPHITIC NANOFIBERS IN ELECTROCHEMICAL CAPACITORS, which claims priority from provisional patent application Ser. No. 60/017,609, filed May 15, 1996.

FIELD OF THE INVENTION

This application generally relates to electrochemical storage devices, more particularly to the application of graphitic nanofibers as electrodes in electrochemical capacitors.

BACKGROUND OF THE INVENTION

Several publications are referenced in this application. These references describe the state of the art to which this invention pertains, and are incorporated herein by reference.

Electrochemical capacitors (ECS) are gaining acceptance in the electronics industry as system designers become familiar with their attributes and benefits. Compared with conventional capacitors, ECs have extremely high capacitance values, limited frequency response, high equivalent series resistance (ESR) which is directly related to electrode thickness and inversely proportional to the cross sectional area of the electrode, voltage-dependent capacitance, and voltage-dependent self-discharge rate. ECs were originally developed to provide large bursts of driving energy for orbital lasers. In complementary metal oxide semiconductor (CMOS) memory backup applications, for instance, a one-Farad EC having a volume of only one-half cubic inch can replace nickel-cadmium or lithium batteries and provide backup power for months. And in electric vehicle applications, large ECs can "load-level" the power on the battery system and thereby increase battery life and extend vehicle range.

Capacitors store energy in the electric field between two oppositely charged parallel plates, which are separated by an insulator. The amount of energy a capacitor can store increases as the area of conducting plates increases, the distance between the plates decreases, and the dielectric constant (the ability to store charge between the plates) of the insulating material increases.

ECs are distinguishable from traditional electrolytic capacitors which store energy by charge separation across a thin insulating oxide film that is often formed by a controlled electrolytic oxidation process at an appropriate metal.

The high volumetric capacitance density of an EC (10 to 100 times greater than conventional capacitors) derives from using porous electrodes to create a large effective "plate area" and from storing energy in the diffuse double layer. This double layer, created naturally at a solid-electrolyte interface when voltage is imposed, has a thickness of only about 1 nm, thus forming an extremely small effective "plate separation". In some ECs, stored energy is substantially augmented by so-called "pseudocapacitance" effects, occurring again at the solid-electrolyte interface. Double layer capacitances are commonly of the order of 16–40 $\mu F\ cm^{-2}$ while pseudocapacitances associated with EC systems are commonly 10–100 $\mu F\ cm^{-2}$.

The double layer capacitor is based on a high surface area electrode material, such as activated carbon, immersed in an electrolyte. A polarized double layer is formed at each electrode providing double-layer capacitance. The carbon provides a high surface area, A, and the effective d is reduced to an atomic scale, thus providing a high capacitance.

Although the energy storage capability of the double layer was recognized more than 100 years ago, it took the development of low-current-draw volatile computer memories to create a market for ECs.

Conventional electrochemical energy storage is achieved in a galvanic cell or a battery of such cells. The energy corresponds to the charge associated with chemical redox changes that can occur in the battery on discharge, multiplied by the voltage difference between the electrodes of the cell. The discharge process involves a net chemical reaction in the cell associated with passage of a certain number of electron or faradays per. mole of reactants.

If an electrochemical reaction, such as a redox process, should occur at or near the electrode, the capacitance may be further increased. This increased capacitance is sometimes termed "pseudocapacitance" and the resulting device, while properly an electrochemical capacitor, is informally called a pseudocapacitor, supercapacitor or ultracapacitor. An electrochemical capacitor will have a different cyclic voltammogram than a pure double-layer capacitor, the pseudocapacitance revealing a Faradaic signature, Redox systems, especially of $RuO_2.xH_2O$, for electrochemical capacitors have been demonstrated (Zheng, Z. P. and Jow, T. R., "A new charge storage mechanism for Electrochemical Capacitors", J. Electrochem. Soc., 142, L6 (1995)), but high cost and limited cycle life are continuing impediments to commercial use of such materials. The greater the Faradaic component of the capacitance, the more the discharge curves and life approach those of a battery rather than those of a capacitor. On the other hand, the specific goals of obtaining high power output suitable for EV applications cannot be met by a pure double layer capacitor using known or proposed electrode materials (Eisenmann, E. T., "Design Rules and Reality Check for Carbon-Based Ultracapacitors", SAND95-0671•UC-400 Apr. 1995).

ECs do not approach the energy density of batteries. For a given applied voltage, capacitatively storage energy associated with a given charge is half that storable in a corresponding battery system for passage of the same charge. This difference is due to the fact that in an ideal battery reaction, involving two-phase systems, charge can be accumulated at constant potential while, for a capacitor, charge must be passed into the capacitor where voltage and charge is being continuously built up. This is why energy storage by a capacitor is half that for the same charge and voltage in battery energy storage under otherwise identical and ideal conditions.

Nevertheless, ECs are extremely attractive power sources. Compared with batteries, they require no maintenance, offer much higher cycle-life, require a very simple charging circuit, experience no "memory effect", and are generally much safer. Physical rather than chemical energy storage is the key reason for their safe operation and extraordinarily high cycle-life. Perhaps most importantly, capacitors offer higher power density than batteries.

However, readily available EC products are limited in size and power performance, due primarily to their targeted memory backup use. They have capacitance values of up to a few Farads, an equivalent series resistance (ESR) of one to fifty ohms, and a working voltage of 3 to 11 V.

Until recently, ECs suitable for high-power applications have been unavailable. But interest in automotive starting, lighting and ignition (SLI) applications, as well as in electric vehicle (EV) load-leveling, has stimulated product development activities for such high-power devices. The goal is to develop products that can be efficiently charged and then discharged in the time specified for these high-rate applications.

Severe demands are placed on the energy storage system used in an EV. The system must store sufficient energy to provide an acceptable driving range. It must have adequate power to provide acceptable driving performance, notably acceleration rate. In addition, the system must be durable to give years of reliable operation. And finally, the system must be affordable. These four requirements are often in conflict for candidate energy storage technologies. This situation creates significant challenges to developers of EV energy storage systems.

A capacitor offers significant advantages to the EV energy storage system. But to be useful, it must store about 400 Wh of energy, be able to deliver about 40 kW of power for about 10 seconds, provide high cycle-life (>100,000 cycles), and meet specified volume, weight and cost constraints. This capacitor does not exist presently.

Electrochemical capacitors, sometimes called ultracapacitors, or supercapacitors, are of interest in hybrid electric vehicles where they can supplement a battery used in electric cars to provide bursts of power needed for rapid acceleration, the biggest technical hurdle to making battery-powered cars commercially viable. A battery would still be used for cruising, but capacitors (because they release energy much more quickly than batteries) would kick in whenever the car needs to accelerate for merging, passing, emergency maneuvers, and hill climbing. To be cost and weight effective compared to additional battery capacity they must combine adequate specific energy and specific power with long cycle life and meet cost targets, as well.

The performance characteristics of an electrochemical capacitor are fundamentally determined by the electrochemistry of the electrodes. Many previously proposed electrode materials result in unacceptably high cost capacitors.

The energy stored in a charged capacitor can be continuously increased in proportion to the increase of the voltage, limited only by electrical breakdown of the dielectric. The maximum available stored energy, for a given chemical species, is determined by the quantity of electroactive materials, their standard electrode potentials and their equivalent weights, and the power by the reversibility of the electrochemical changes that take place over discharge together with the electrical resistivity of the materials and external circuity Experience with carbon electrode electrochemical capacitors shows that geometrical capacitance calculated from the measured surface area and the width of the dipole layer is not routinely achieved. In fact, for very high surface area carbons, typically only about ten percent of the "theoretical" capacitance seems to be found.

This disappointing performance is related to the presence of micropores and ascribed to wetting deficiencies and/or the inability of a double layer to form successfully in pores in which the oppositely charged surfaces are less than about 20 Å apart. In activated carbons, depending on the source of the carbon and the heat treatment temperature, a surprising amount of surface can be in the form of such micropores (Byrne, J. F. and Marsh, H., "Introductory Overview" in Patrick, J. W., *Porosity in Carbons: Characterization and Applications*, Halsted, 1995).

The fundamental reasons for considering electrochemical capacitors instead of batteries are power density and life. While these are inherent in a truly capacitative system, the energy density goals sought in, for example, electric vehicle applications cannot be met in such a system. Efforts to push the envelope of electrochemical capacitor energy storage always rely on a substantial fraction (most) of the capacitance coming from a Faradaic mechanism.

It would be desirable to produce a electrochemical capacitor exhibiting greater geometrical capacitance using a carbon based electrode having a high accessible surface area, high porosity, and reduced or no micropores. The presence of micropores in the current carbon based electrodes makes it inapplicable to the EV energy storage system.

OBJECTS OF THE INVENTION

It is therefore an object of this invention to provide a carbon nanofiber based electrode to increase the performance of the electrochemical capacitor.

It is also an object of this invention to surface treat the nanofiber based electrode to modify the Faradaic capacitance.

It is a further object of this invention to provide a functionalized nanofibers for use in such electrode.

SUMMARY OF THE INVENTION

In its broadest embodiment, the invention relates to the application of a nanotube (nanofiber) for electrochemical capacitor electrodes as shown in FIG. 1. In particular, said nanofiber is a graphitic nanofiber. More particularly, the invention relates to electrodes comprising carbon nanofibers having high surface area (>100 m²/gm) and being substantially free of micropores (i.e., pores with diameter or cross-section less than 2 nm). Even more particularly, the invention relates to the use of such electrode in electrochemical capacitors. Preferably, the electrodes each comprise carbon nanofibers functionalized with different functional group.

In one embodiment, the invention relates to a capacitor having an electrode comprising nanofibers having a surface area greater than about 100 m²/gm. Advantageously, the nanofibers are substantially free of micropores or the micropores contribute not more than 5% of the surface area.

Preferably the nanofibers are functionalized, for example with one or more functional groups selected from quinone, hydroquinone, quaternized aromatic amines, mercaptans or disulfides. The functional groups may be contained in a ladder polymer of the formula

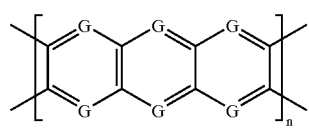

wherein G is CH or N, or may be a graphenic analogue of one or more of

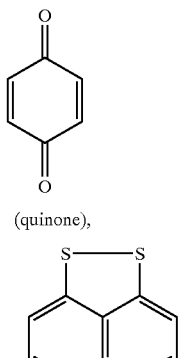

(quinone),

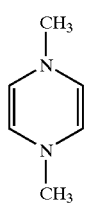

(1,8 napthaline disulfide) and

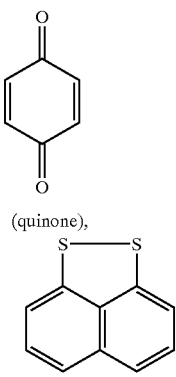

(N,N' dimethyl pyrazine).

The nanofibers are advantageously carbon nanofibers being substantially cylindrical with a substantially constant diameter, having graphitic layers concentric with the nanofiber axis and being substantially free of pyrolytically deposited carbon.

The nanofibers may be coated with a thin coating layer of a pyrolyzed carbonaceous polymer. The coating layer preferably comprises one or more polymers selected from the group consisting of phenolics-formaldehyde, polyacrylonitrile, styrene DVB, cellulosic polymers, and H-resin.

The nanofibers may be intertwined and interconnected to form a rigid porous carbon structure.

In another embodiment the invention relates to an electrode comprising nanofibers having a surface area greater than about 100 m$^2$/gm. Advantageously, the nanofibers are substantially free of micropores or the micropores contribute not more than 5% of the surface area.

Preferably the nanofibers are functionalized, for example with one or more functional groups selected from quinone, hydroquinone, quaternized aromatic amines, mercaptans or disulfides. The functional groups may be contained in a ladder polymer of the formula

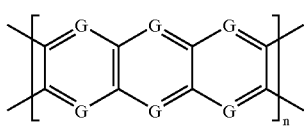

wherein G is CH or N, or may be a graphenic analogue of one or more of (quinone),

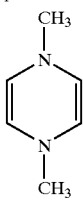

(1,8 napthaline disulfide) and (N,N' dimethyl pyrazine).

The nanofibers are advantageously carbon nanofibers being substantially cylindrical with a substantially constant diameter, having graphitic layers concentric with the nanofiber axis and being substantially free of pyrolytically deposited carbon.

The nanofibers may be coated with a thin coating layer of a pyrolyzed carbonaceous polymer. The coating layer preferably comprises one or more polymers selected from the group consisting of phenolics-formaldehyde, polyacrylonitrile, styrene DVB, cellulosic polymers, and H-resin.

The nanofibers may be intertwined and interconnected to form a rigid porous carbon structure.

In a further embodiment the invention relates to a capacitor, comprising:
  a first electrode, the first electrode comprising nanofibers having a surface area greater than about 100 m$^2$/gm;
  a second electrode, the second electrode comprising nanofibers having a surface area greater than about 100 m2/gm; and
  an electrode separator disposed between the electrodes, the electrode separator comprising an electrically non-conductive and ionically conductive material.

Advantageously, the nanofibers are substantially free of micropores or the micropores contribute not more than 5% of the surface area.

The nanofibers of the electrodes are functionalized, for example with one or more functional groups selected from quinone, hydroquinone, quaternized aromatic amines, mercaptans or disulfides. The functional groups may be contained in a ladder polymer of the formula

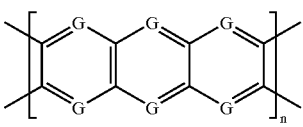

wherein G is CH or N,
or may be a graphenic analogue of one or more of

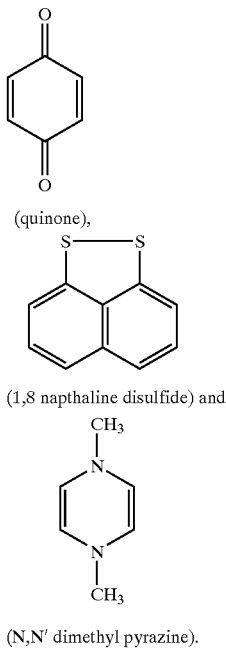

(quinone), (1,8 napthaline disulfide) and (N,N' dimethyl pyrazine).

The nanofibers of said first electrode may be functionalized with the same functional groups as said nanofibers of said second electrode.

The nanofibers of said first and second electrodes are advantageously carbon nanofibers being substantially cylindrical with a substantially constant diameter, having graphitic layers concentric with the nanofiber axis and being substantially free of pyrolytically deposited carbon.

The nanofibers of said first and second electrodes may be coated with a thin coating layer of a pyrolyzed carbonaceous polymer. The coating layer preferably comprises one or more polymers selected from the, group consisting of phenolics-formaldehyde, polyacrylonitrile, styrene DVB, cellulosic polymers, and H-resin.

The nanofibers of said first and second electrodes may be intertwined and interconnected to form a rigid porous carbon structure.

The nanofibers of said first electrode may be functionalized with different functional groups than said nanofibers of said second electrode.

The second electrode advantageously has a redox voltage different from said first electrode. Preferably the redox voltage of said second electrode is near zero (NHE).

In yet another embodiment the invention relates to a capacitor comprising a plurality of cells,
  each cell comprising:
    a first electrode, the first electrode comprising nanofibers having a surface area greater than about 100 $m^2/gm$;
    a second electrode, the second electrode comprising nanofibers having a surface area greater than about 100 $m^2/gm$; and
    an electrode separator disposed between the electrodes, the electrode separator comprising an electrically nonconductive and ionically conductive material; and
  an electrical connection between the cells.

In still another embodiment the invention relates to a wound roll capacitor comprising two layers of nanofiber electrode having a surface area greater than about 100 $m^2/gm$ and at least two layers of electrode separator comprising electrically nonconductive and ionically conductive material.

The invention also relates to d capacitor, comprising
  a first electrode having a surface area greater than about 100 $m^2/gm$;
  a second electrode having a surface area greater than about 100 $m^2/gm$, wherein the second electrode has a redox potential different from said first electrode;
  an electrode separator disposed between the electrodes, the electrode separator comprising an electrically nonconductive and ionically conductive material; and
  wherein redox reactions occur only at the surface of said first and second electrodes.

DETAILED DESCRIPTION OF THE INVENTION

Definition of Terms

The term "functional group" refers to groups of atoms that give the compound or substance to which they are linked characteristic chemical and physical properties. A "functionalized" surface refers to a carbon surface on which chemical groups are adsorbed or chemically attached so as to be available for electron transfer with the carbon and far interaction with ions in the electrolyte. Functional groups typically associated with this invention include, but are not limited to, functional groups selected from the group consisting of —$SO_3$, —R'COX, —R'(COOH)$_2$, —CN, —R'CH$_2$X, =O, —R'CHO, —R'CN, where R' is a hydrocarbon radical and X is —NH$_2$, —OH or a halogen.

"Graphenic" carbon is a form of carbon whose carbon atoms are each linked to three other carbon atoms in an essentially planar layer forming hexagonal fused rings. The layers are platelets only a few rings in diameter or they may be ribbons, many rings long but only a few rings wide. There is no order in the relation between layers, few of which are parallel. Many of the spaces between layers are useful pores for electrochemical capacitors.

In "graphitic" carbon the layers are essentially parallel to one another and no more than 3.6 Å apart.

The term "micropore" refers to a pore in which at least one dimension is too small to permit double layer formation or Faradaic processes or ionic diffusion, yet will allow the adsorption of nitrogen (BET accessible).

The term "nanofiber," "nanotube," and fibril are used in interchangeably. Each refers to elongated structures having a cross section (e.g., angular fibers having edges) or diameter (e.g., rounded) less than 1 micron. The structure may be either hollow or solid.

The term "polymer" refers to a high-molecular-weight materials formed from monomers by any of a number of known methods.

The term "pore" refers to an opening or depression in the surface of a coated or uncoated nanofiber.

The term "pseudocapacitance" and "Faradaic capacitance" are used interchangeably.

The term "pyrolysis" refers to a chemical change in a substance occasioned by the application of heat alone.

The term "relatively" means that ninety-five percent of the values of the physical property will be within plus or minus fifty percent of a mean value.

The term "Substantially" means that ninety-five percent of the values of the physical property will be within plus or minus ten percent of a mean value.

The term "surface area" refers to the total surface area of a substance measurable by the BET technique.

The term "thin coating layer" refers the layer of conducting nonmetallic substance which is deposited on the nanofiber. Typically, the thin coating layer is a carbon layer which is deposited by the application of a polymer coating substance followed by pyrolysis of the polymer.

The invention, as well as other objects and features thereof, will be understood more clearly and fully from the following description of certain preferred embodiments.

Figure 1:
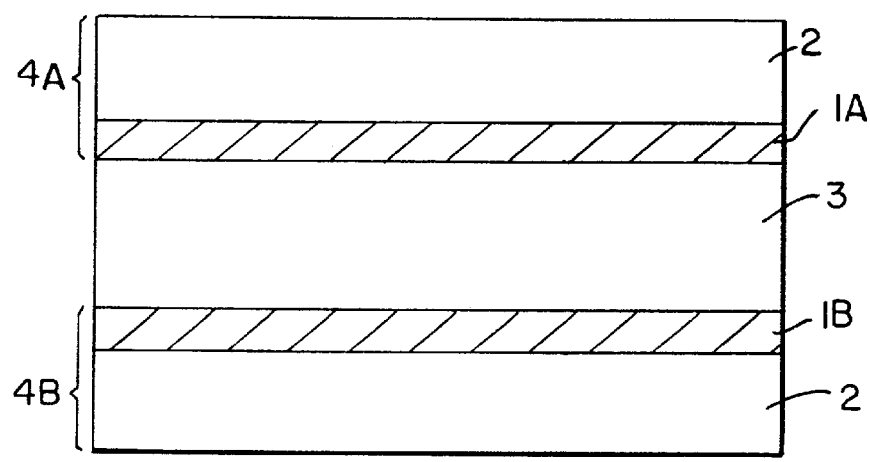
FIG. 1 is a schematic drawing of a capacitor structure of the present invention.

Referring to the figures, FIG. 1 shows the cross section of a basic capacitor structure (cell) of the present invention. Functionalized nanofiber mats 1A and 1B are bounded to two separate conductor plate mesh 2 to form two functionalized nanofiber electrodes 4A and 4B having high surface area, greater than 100 $m^2$/gm or preferably greater than 200 $m^2$/gm. The conductor plate mesh 2 can be a metal sheet, such as gold, aluminum, etc., or a carbon sheet, such as carbon fiber paper where the pores are filled with functionalized nanofibers or functionalized nanofiber mats. Preferably, the dimensions of the electrodes are about 5–10 cm in length and width, and about 1 cm in height.

Two functionalized nanofiber electrodes 4A and 4B are separated by a porous separator 3, which can be any ionic conducting electrolyte (aqueous or nonaqueous). Each layer is in intimate contact with each other, and electrolyte fully floods the pores of the functionalized nanofiber mats. Functionalized nanofiber mats 1A and 1B are preferably formed from fibrils which are typically 100 Å in diameter and several microns long. Like graphite, fibrils are composed of parallel layers of carbon atoms but in the form of a series of concentric tubes disposed about the longitudinal axis of the fibers rather than as multi-layers of flat graphite sheets.

Graphitic Nanofibers

The nanofibers may be used in the electrochemical capacitors in various geometries including as dispersed, as aggregates, as mats or films, attached to larger supports, or mixed with another material and used as a composite. Nanofibers primarily consist of chemically-modifiable graphitic carbon. They generally have diameters no greater than 0.1 $\mu$m and length to diameter ratios of at least 5. Typically, they have diameters of 0.01 $\mu$m and lengths of 1–10 $\mu$m.

Since the 1970s graphitic nanofibers and fibrils have been identified as materials of interest for a variety of applications. Submicron graphitic nanofibers are sometimes called vapor grown carbon fibers. Carbon nanofibers are vermicular carbon deposits having diameters lass than 1.0$\mu$, preferably less than 0.5$\mu$, and even more preferably less than 0.2$\mu$. They exist in a variety of forms and have been prepared through the catalytic decomposition of various carbon-containing gases at metal surfaces. Such vermicular carbon deposits have been observed almost since the advent of electron microscopy. A good early survey and reference is found in Baker and Harris, *Chemistry and Physics of Carbon*, Walker and Thrower ed., Vol. 14, 1978, p. 83. See also, Rodriguez, N., *J. Mater. Research*, Vol. 8, p. 3233 (1993).

In 1976, Endo et al. (see Obelin, A. and Endo, M., *J. of Crystal Growth*, Vol. 32 (1976), pp. 335–349) elucidated the basic mechanism by which such carbon fibrils grow. They were seen to originate from a metal catalyst particle, which, in the presence of a hydrocarbon containing gas, becomes supersaturated in carbon. A cylindrical ordered graphitic core is extruded which immediately, according to Endo et al., becomes coated with an outer layer of pyrolytically deposited graphite. These fibrils with a pyrolytic overcoat typically have diameters in excess of 0.1$\mu$, more typically 0.2 to 0.5$\mu$.

In 1983, Tennent, U.S. Pat. No. 4,663,230, succeeded in growing cylindrical ordered graphite cores, uncontaminated with pyrolytic carbon. Thus, the Tennent invention provided access to smaller diameter fibrils, typically 35 to 700 Å (0.0035 to 0.070$\mu$) and to an ordered, "as grown" graphitic surface. Fibrillar carbons of less perfect structure, but also without a pyrolytic carbon outer layer have also been grown.

Fibrils, buckytubes and nanofibers are distinguishable from continuous carbon fibers commercially available as reinforcement materials. In contrast to fibrils, which have, desirably large, but unavoidably finite aspect ratios, continuous carbon fibers have aspect ratios (L/D) of at least $10^4$ and often $10^6$ or more. The diameter of continuous fibers is also far larger than that of fibrils, being always >1.0$\mu$ and typically 5 to 7$\mu$.

Continuous carbon fibers are made by the pyrolysis of organic precursor fibers, usually rayon, polyacrylonitrile (PAN) and pitch. Thus, they may include heteroatoms within their structures The graphitic nature of "as made" continuous carbon fibers varies, but they may be subjected to a subsequent graphitization step. Differences in degree of graphitization, orientation and crystallinity of graphite planes, if they are present, the potential presence of heteroatoms and even the absolute difference in substrate diameter make experience with continuous fibers poor predictors of nanofiber chemistry.

Tennent, U.S. Pat. No. 4,663,230 describes carbon fibrils that are free of a continuous thermal carbon overcoat and have multiple graphitic outer layers that are substantially parallel to the fibril axis. As such they may be characterized as having their c-axes, the axes which are perpendicular to the tangents of the curved layers of graphite, substantially perpendicular to their cylindrical axes. They generally have diameters no greater than 0.1$\mu$ and length to diameter ratios of at least 5. Desirably they are substantially free of a continuous thermal carbon overcoat, i.e., pyrolytically deposited carbon resulting from thermal cracking of the gas feed used to prepare them.

Tennent, et al., U.S. Pat. No. 5,171,560, describes carbon fibrils free of thermal overcoat and having graphitic layers substantially parallel to the fibril axes such that the projection of said layers on said fibril axes extends for a distance of at least two fibril diameters. Typically, such fibrils are substantially cylindrical, graphitic nanofibers of substantially constant diameter and comprise cylindrical graphitic sheets whose c-axes are substantially perpendicular to their cylindrical axis. They are substantially free of pyrolytically deposited carbon, have a diameter less than 0.1$\mu$ and a length to diameter ratio of greater than 5. These fibrils are of primary interest in the invention.

Further details regarding the formation of carbon fibril aggregates may be found in the disclosure of Snyder et al., U.S. patent application Ser. No. 149,573, filed Jan. 28, 1988, and PCT Application No. US89/00322, filed Jan. 28, 1989 ("Carbon Fibrils") WO 89/07163, and Moy at al., U.S. patent application Ser. No. 413,837 filed Sep. 28, 1989 and PCT Application No. US90/05498, filed Sep. 27, 1990 ("Fibril Aggregates and Method of Making Same") WO 91/05089, all of which are assigned to the same assignee as the invention here.

Moy et al., U.S. Ser. No. 07/887,307 filed May 22, 1992, describes fibrils prepared as aggregates having various macroscopic morphologies (as determined by scanning electron microscopy) in which they are randomly entangled with each other to form entangled balls of fibrils resembling bird nests (BN): or as aggregates consisting of bundles of straight to slightly bent or kinked carbon fibrils having substantially the same relative orientation, and having the appearance of combed yarn ("CY") e.g., the longitudinal axis of each fibril (despite individual bends or kinks) extends in the same direction as that of the surrounding fibrils in the bundles; or, as, aggregates consisting of straight to slightly bent or kinked fibrils which are loosely entangled with each other to form an "open net" ("ON") structure. In open net structures the degree of fibril entanglement is greater than observed in the combed yarn aggregates (in which the individual fibrils have substantially the same relative orientation) but less than that of bird nests. CY and ON aggregates are more readily dispersed than BN making them useful in composite fabrication where uniform properties throughout the structure are desired.

When the projection of the graphitic layers on the fibril axis extends for a distance of less than two fibril diameters, the carbon planes of the graphitic nanofiber, in cross section, take on a herring bone appearance. These are termed fishbone fibrils. Geus, U.S. Pat. No. 4,855,091, provides a procedure for preparation of fishbone fibrils substantially free of a pyrolytic overcoat. These fibrils are also useful in the practice of the invention.

Carbon nanotubes of a morphology similar to the catalytically grown fibrils described above have been grown in a high temperature carbon arc (Iijima, Nature 354 56 1991). It is now generally accepted (Weaver, Science 265 1994) that these arc-grown nanofibers have the same morphology as the earlier catalytically grown fibrils of Tennent. Arc grown carbon nanofibers are also useful in the invention.

Fibrils have dimensions and morphologies similar to the nanotubes reported by S. Iijima, Nature 354, 56 (1991) and S. Iijima, T. Ichihashi, and Y. Ando, Nature 356, 776 (1992), made by an electric arc process and more recently made catalytically by S. Amelinckx, et al., Science 265, 635 (1994).

In contrast to arc grown tubules, vapor grown fibrillar carbons are produced as free flowing aggregates uncontaminated with amorphous carbon or other graphitic non-tube structures. The porosity of aggregates is extremely high. These aggregates can be dispersed and reassembled into macrostructures composed of interconnected fibril nanotubes, similar to felt fiber mats.

Carbon nanotubes can be oxidized to yield-high surface concentrations of oxygen-containing groups (Bening et al. PCT/US 90/02667 published as WO 90/14221 on Nov. 29, 1990; McCarthy, T. and Bening, R., Polymer Preprints, 30(1), 420 (1990)). These oxidized nanotubes are readily and highly dispersible in polar solvents and form mats with densities as high as about 1.0 g/cc. Their acidic functionalities are also convertible by conventional organic reactions to virtually any desired secondary functional group, thereby providing a wide range of surface hydrophilicity or hydrophobicity.

Fibrils are electrically conductive. While the conductivity of individual fibrils is difficult to measure, one attempt (Whitesides, G. and Weisbacher, C.S., "Measurement of the Conductivity of Individual Carbon Nanotubes", presented at MRS Meeting, San Francisco, 1994) has yielded an estimated resistivity value of 9.5 (±4.5)×$10^{-3}$ Ωcm, a resistivity slightly higher than typically measured for graphinized carbon. When compressed into mat electrodes, careful measurements of the resistivity as a function of temperature give a value of 24×$10^{-3}$ Ωcm, at room temperature.

Because of their small diameter, fibrils have a surface area of about 200 $m^2/g$ as determined by BET measurement. The value for the surface area can also be arrived at by calculation based on average fibril dimensions. This agreement between calculation and the BET measurement demonstrates that the 200 $m^2/g$ is all on the external surface of the fibrils. Analytical electrochemistry of fibril mat electrodes 1A and 1B demonstrates that all of the fibril surface area is available for electrochemical processes. For example, the double layer charging capacitance of fibril mat electrodes varies linearly with the mass of fibrils in the electrode over a wide range of fibril mat densities.

In one embodiment, the electrodes 4A and 4B are identical to form a symmetric diffuse double layer capacitor. In other words, the fibril mats 1A and 1B are functionalized with the same functional group (or identically oxidized) to form symmetric electrodes. The diffuse double layer forming an extremely small effective plate separation is created naturally at the electrode-electrolyte interface when voltage is applied. Thus, a polarized double layer is formed at each electrode comprising millions of tiny plates separating electric charge.

Figure 4:
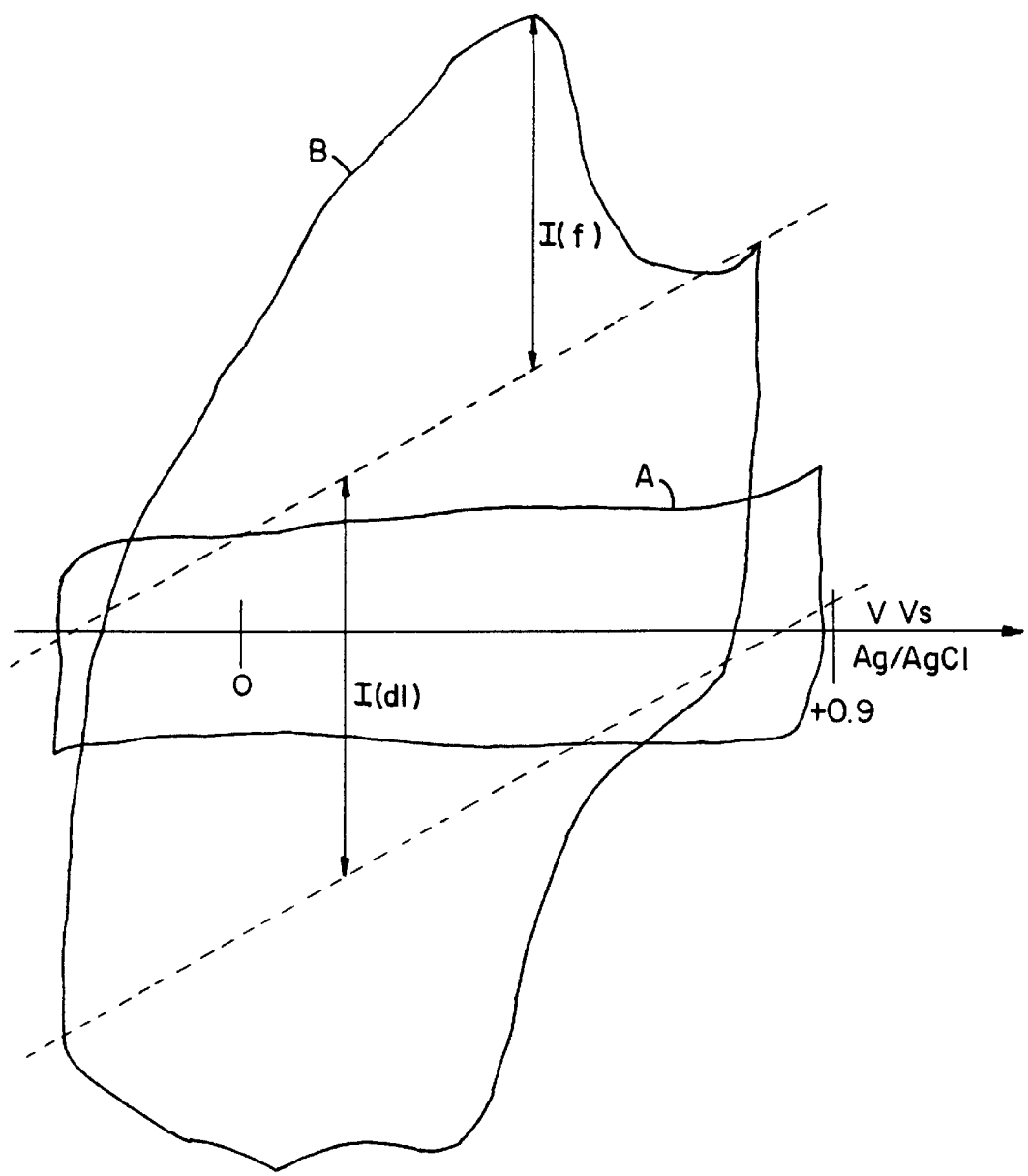
FIG. 4 is a graph showing the cyclic voltammetric (CV) curves in 0.05 M sulfuric acid using symmetric electrodes made from either untreated or oxidized graphitic nanofibers.

The cyclic voltammetric (CV) curves in FIG. 4 show a large difference between the behavior of untreated nanofiber electrodes and electrodes made from nitric acid oxidized material. A rectangular shape of curve A using the untreated nanofiber electrodes is a signature of purely capacitive double layer charging. The pores in the fibril mats 1A and 1B act as millions of tiny "plates" separating electric charge, so that the total area of the "plates" is maximized while the space between the "plates" is minimized. The double layer capacitance contributes approximately 44 $\mu F/cm^2$ to the CV of the nitric acid oxidized fibrils. Faradaic processes are indicated by the non-rectangular shape of the CV curve B using the nitric acid oxidized fibrils. FIG. 4 shows that the nitric acid oxidized fibrils have a large pseudocapacitance comparable to the double layer contribution.

A direct indication of the utility of nanofibers in electrochemical capacitors comes from measurements of AC capacitance of oxidized nanofiber electrodes in sulfuric acid electrolyte. A device of FIG. 1 was assembled using electrodes made from an oxidized (functionalized) nanofiber mat with density about 1.0 gm/cc. Capacitance and equivalent series resistance (ESR) were measured at room temperature with a 10 mV AC signal at o-V and 1.0 V bias over the frequency range from 65×$10^3$ to $10^{-3}$ Hz according to method DOD-C-29501. In summary, a low frequency, 0-V bias capacitance of 3.23 F was measured which corresponds to a capacitance of 86 F/gm for the oxidized electrode nanofiber. The device exhibited ideal capacitive behavior up to about 2 Hz for 0-V bias and at frequencies up to about 4 Hz at 1 V bias. Equivalent series resistance was approximately 0.1Ω.

There are several reasons to believe that the measured capacitance contains a significant Faradaic component:

1) The measured capacitance at a bias potential of one volt is about half that at zero volts.
2) The cyclic voltammetry as shown in FIG. 4.
3) The "typical" surface capacitance of carbons ranges from 10 to 40 $\mu F/cm^2$ but the capacitance of basal plane graphite has been measured to be only 3 $\mu F/cm^2$ (Randin, J. P. and Yeager, E., J. Electroanal. Chem. 36, 257 (1972); Randin, J. P. and Yeager, E., ibid 58, 313 (1975)); one would expect the surface of nanotubes to be largely basal plane graphite.

There are fundamental advantages of nanofiber based electrochemical capacitors.

First, over 200 $m^2/gm$ of exceptionally available surface is provided because of the total absence of micropores, as seen in the cyclic voltammetry in FIG. 4. Thus, what one seeks is 100% utilization of 200 $m^2/gm$ compared to a poorer utilization of a larger specific surface typical of most carbon based electrodes.

Figure 2:
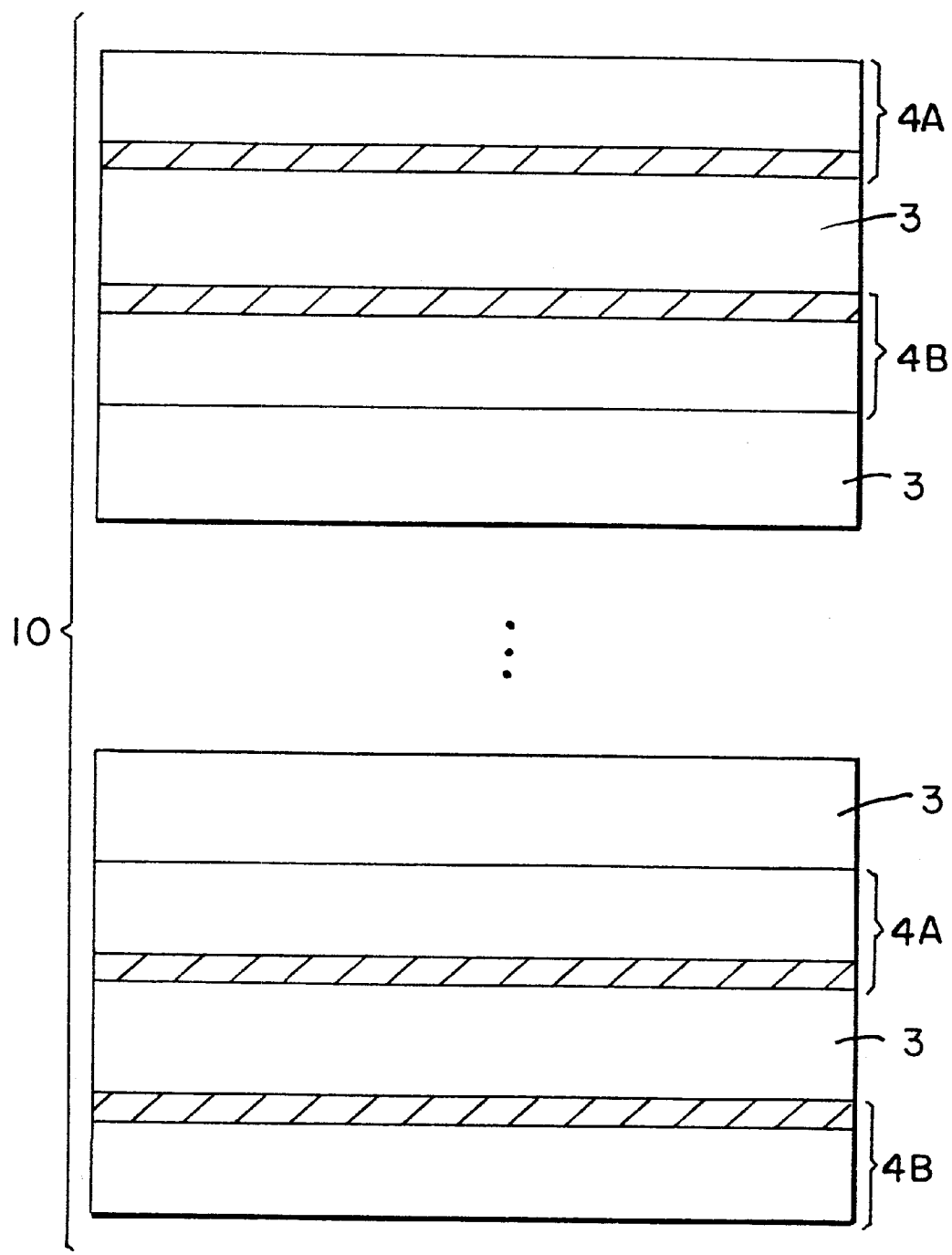
FIG. 2 is a schematic representation of the capacitor of FIG. 1 in a stack construction.

Moreover, by repeating the capacitor cell of FIG. 1, additional cells composed of electrodes with similar layers and separators may be created in order to form a multicell stack 10 (FIG. 2) that may be joined together by an electrical connection (not shown) for a high energy density electrochemical capacitor device. Individual capacitor electrodes are electrically isolated from one another by an electrically nonconductive, but ionically conductive separator 3, as illustrated in FIG. 2. Electrical nonconductivity is essential in order to maintain intracell voltage differences. In addition, the separator 3 must be sufficiently porous to facilitate ionic conduction, a major component of the internal electrochemical capacitor resistance.

Figure 3:
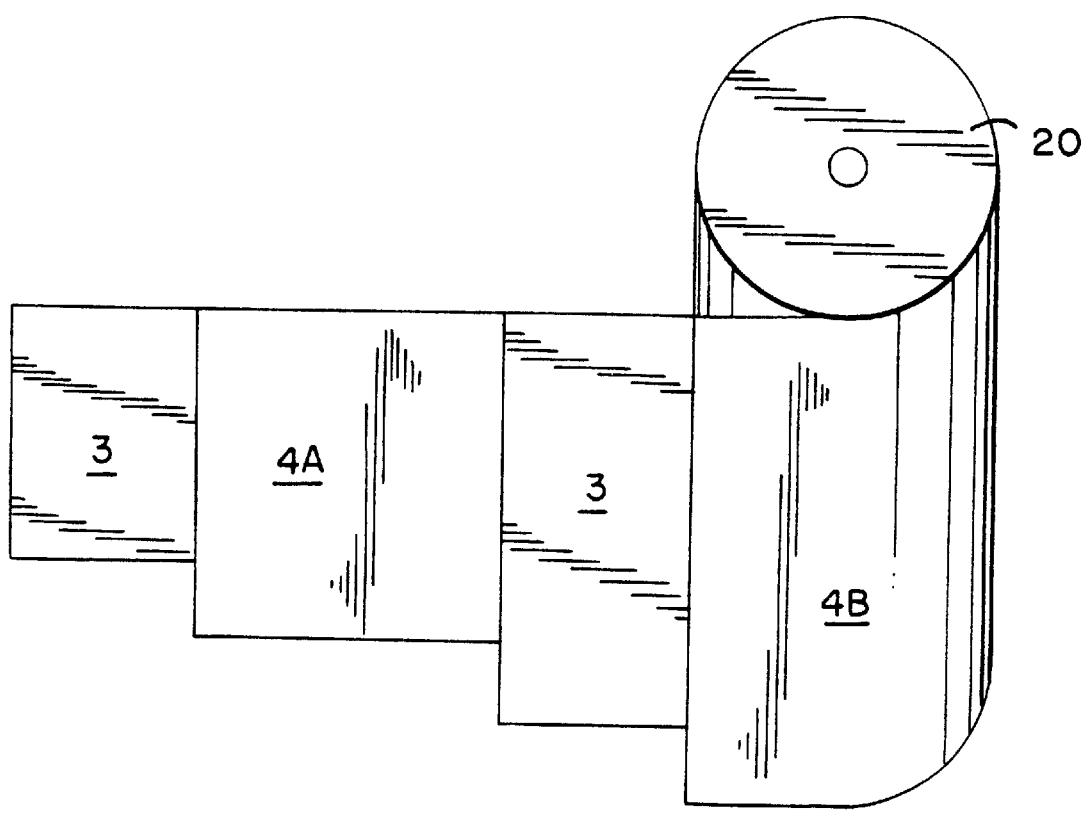
FIG. 3 is a schematic representation of wound-roll construction of the capacitor of FIG. 1.

Instead of stacking the electrodes to create a multicell stack 10, the electrodes can be lengthen and wound in a "jelly-roll" 20 as shown in FIG. 3 to provide a high energy density electrochemical capacitor device.

Preferably in a "jelly-roll" 20, the electrodes are approximately 100 cm in length and approximately 5 cm in width.

In addition, there is the ability to surface treat the nanofibers to modify the Faradaic contribution at the nanofiber stage and then assemble into electrode mats by simple filtration. This is in contrast to aerogels, and other high surface area carbons which, once formed, are difficult to derivatize internally.

In accordance with another embodiment of the invention, the electrodes may comprise nanofibers which are coated with a very thin porous layer of a pyrolyzed carbonaceous polymer. Heat is then applied to the thin polymer layer to pyrolyze non-carbon constituents of the polymer, leaving "holes" in the polymer where these non-carbon substituents previously were. The holes left by the pyrolysis of the non-carbon polymer constituents effectively create increased surface area. Effective surface area of the nanofiber may be further increased by the process known as "activation". Such high surface area nanofibers and method of making them are set forth in concurrently filed Provisional Application Serial. No. 60/017,787 entitled "High Surface Area Nanofibers, Methods of Making, Methods of Using and Products Containing Same" by Howard Tennent, David Moy and Chun-Ming Niu, hereby incorporated by reference.

Because, ideally, only surface groups are involved, the charge/discharge event is rapid and excessive molecular rearrangement which may lead to physical instability is avoided. Thus, the power density and life advantage of the electrochemical capacitor is preserved while encroaching on the mechanism and energy density regime of batteries.

According to yet another embodiment of the invention, the electrodes may comprise nanofiber in, the form of a rigid porous structure comprising intertwined carbon nanofibers. The rigidity of the nanofibers are improved by causing the nanofibers to form bonds or become glued with other nanofiber at the fiber intersections. The bonding can be induced by chemical modifications of the surface of the nanofibers to promote bonding, by adding "gluing" agents and/or by pyrolyzing the nanofibers to cause fusion or bonding at the interconnect points. Such structure and method of making them are set forth in concurrently filed U.S. Provisional Application Serial No, 60/020,804 entitled "Rigid Porous Carbon Structures, Methods of Making, Methods of Using and Products containing Same" by Howard Tennent, David Moy and Chun-Ming Niu, hereby incorporated by reference.

In accordance with a further embodiment of the invention, two electrodes 4A and 4B with different redox potential are used. In other words, each of the nanofiber mats 1A and 1B are functionalized with a different functional group to form asymmetric electrodes with different Faradaic characteristics. Advantageously, one of the nanofiber electrodes has a redox voltage near zero (normal hydrogen electrode, NHE).

Such an asymmetric Faradaic pseudocapacitor can store up to four times the energy of a purely double layer capacitor when the initial voltage is the difference between the redox potentials of its functional groups. This is because the average voltage of the double layer capacitor is one half of that initial voltage if discharge goes to zero volts and because the two electrodes of a double layer capacitor device act as two separate capacitors connected in series. Hence, the voltage across each is only one half the device voltage.

Two 200 m2/gm electrodes carrying surface groups with redox potential one volt apart, assuming 50% of device weight is electrode weight, and having a loading of one functional group per six surface carbons would achieve a specific energy of 15 Wh/Kg. Lower loading would be needed at higher surface area.

Based on the equivalent series resistance measured at one volt, assuming electrodes comprise 50% of device weight, a peak power of 3350 W/Kg is calculated.

The specific capacitance of fibrils is increased several fold in two ways: (1) increasing the effective surface area by coating them with a very thin porous layer of a pyrolyzed carbonaceous polymer which can be functionalized with high concentrations of redox groups; and (2) incorporating therein (separately) such groups with strongly oxidizing or reducing potential. Ideally, unlike a conventional battery, the redox reactions at or near the surface of the electrodes do not involve a phase change In a conventional battery, a conversion from one oxidation state to another proceeds ideally at a singular potential until virtually all of one phase is converted to another (see B. E. Conway "Transition from 'Supercapacitor' to 'Battery' Behavior in Electrochemical Energy Storage," J. Electrochem. Soc. Vol. 138, No. 6, June 1991, incorporated herein by reference) Essentially this will result in a hybrid between a pure capacitor and a rechargeable battery.

Preferably, the oxidizing half-cell is the quinone/hydroquinone couple believed responsible for the observed pseudocapacitance of oxidized nanofibers. The other half-cell preferably contains quaternized aromatic amines, or the meraptan-disulfide couple:

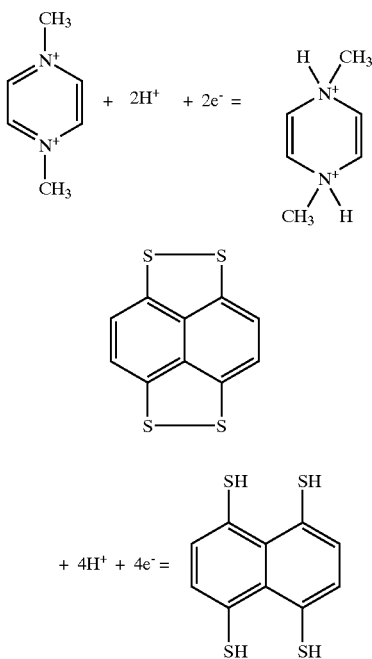

Preferably, the polymer containing these groups is a ladder of aromatic rings:

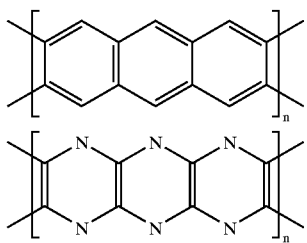

The carbonaceous polymer is formed by oxidative coupling and cyclization of acetylenes. The nitrogenous ladder is formed by polymerization of cyanogen, or by pyrolytic dehydrogenation of the carbonaceous ladder followed by reaction with $N_2$ (Urry, G., *Elementary Equilibrium Chemistry of Carbon*, Wiley, N.Y. 1989). The polymers are functionalized by known aromatic reactions or by pyrolytic dehydrogenation followed by addition of $O_2$ (Id.), $S_2$ or functionalized acetylenes.

Broadly the particles are functionalized nanofibers, i.e., nanofibers whose surface has been reacted or contacted with one or more substances to provide active sites thereon for chemical substitution or physical adsorption of different chemical species.

McCarthy et al., U.S. patent application Ser. No. 351,967 filed May 15, 1989, describes processes for oxidizing the surface of carbon fibrils that include contacting the fibrils with an oxidizing agent that includes sulfuric acid ($H_2SO_4$) and potassium chlorate ($KClO_3$) under reaction conditions (e.g., time, temperature, and pressure) sufficient to oxidize the surface of the fibril. The fibrils oxidized according to the processes of McCarthy, et al. are non-uniformly oxidized, that is, the carbon atoms are substituted with a mixture of carboxyl, aldehyde, ketone, phenolic and other carbonyl groups.

Nanofibers have also been oxidized non-uniformly by treatment with nitric acid. International Application PCT/ US94/10168 discloses the formation of oxidized fibrils containing a mixture of functional groups. Hoogenvaad, M. S., et al. ("Metal Catalysts supported on a Novel Carbon Support", Presented at Sixth International Conference on Scientific Basis for the Preparation of Heterogeneous Catalysts, Brussels, Belgium, September 1994) also found it beneficial in the preparation of fibril-supported precious metals to first oxidize the fibril surface with nitric acid. Such pretreatment with acid is a standard step in the preparation of carbon-supported noble metal catalysts, where, given the usual sources of such carbon, it serves as much to clean the surface of undesirable materials as to functionalize it.

In published work, McCarthy and Bening (Polymer Preprints ACS Div. of Polymer Chem. 30 (1)420(1990)) prepared derivatives of oxidized fibrils in order to demonstrate that the surface comprised a variety of oxidized groups. The compounds they prepared, phenylhydrazones, haloaromaticesters, thallous salts, etc., were selected because of their analytical utility, being, for example, brightly colored, or exhibiting some other strong and easily identified and differentiated signal.

Functionalized Nanofibers

Advantageously, the nanofibers are functionalized nanofibers, i.e. nanofibers whose surfaces are uniformly or non-uniformly modified so as to have a functional chemical moiety associated therewith. The nanofiber surfaces may be functionalized by reaction with oxidizing or other chemical media. The nanofiber surfaces may be uniformly modified either by chemical reaction or by physical adsorption of species which themselves have a chemical reactivity. The nanofiber surfaces may be modified e.g. by oxidation and may be further modified by reaction with other functional groups. The nanofiber surfaces may be modified with a spectrum of functional groups so that the nanofiber can be chemically reacted or physically bonded to chemical groups in a variety of substrates.

Complex structures of nanofibers may be obtained by linking functional groups on the fibrils with one another by a range of linker chemistries.

The nanofiber may be functionalized to enhance the properties of the capacitors. Functionalized nanofibers and methods of making are set forth in U.S. patent application Ser. No. 08/352,400 filed on Dec. 8, 1994 for FUNCTIONALIZED NANOTUBES, hereby incorporated by reference. The nanofibers are preferably functionalized nanofibers which broadly have the formula $$[C_nH_L]R_m$$

where n is an integer, L is a number less than 0.1n, m is a number less than 0.5n, each of R is the same and is selected from $SO_3H$, COOH, $NH_2$, OH, O, CHO, CN, COCl, halide, COSH, SH, R', COOR', SR', $SiR'_3$, $Si-(OR'-)_yR'_{3-y}$, $Si-(O-SiR'_2-)-OR'$, R", Li, $AlR'_2$, Hg—X, $TlZ_2$ and Mg—X, y is an integer equal to or less than 3, R' is alkyl, aryl, heteroaryl, cycloalkyl aralkyl or heteroaralkyl, R" is fluoroalkyl, fluoroaryl, fluorocycloalkyl, fluoroaralkyl or cycloaryl, X is halide, and Z is carboxylate or trifluoroacetate.

The carbon atoms, $C_n$, are surface carbons of the nanofiber.

The nanofibers also include non-uniformly substituted nanofibers. Also included are functionalized nanofibers having the formula $$[C_nH_L][R'—R]_m$$

where n, L, m, R' and R have the same meaning as above.

In both uniformly and non-uniformly substituted nanofibers, the surface atoms $C_n$ are reacted. Most carbon atoms in the surface layer of a graphitic nanofiber, as in graphite, are basal plane carbons. Basal plane carbons are relatively inert to chemical attack. At defect sites, where, for example, the graphitic plane fails to extend fully around the nanofiber, there are carbon atoms analogous to the edge carbon atoms of a graphite plane (See Urry, *Elementary Equilibrium Chemistry of Carbon*, Wiley, N.Y. 1989.) for a discussion of edge and basal plane carbons).

At defect sites, edge or basal plane carbons of lower, interior layers of the nanofiber may be exposed. The term surface carbon includes all the carbons, basal plane and edge, of the outermost layer of the nanofiber, as well as carbons, both basal plane and/or edge, of lower layers that may be exposed at defect sites of the outermost layer. The edge carbons are reactive and must contain some heteroatom or group to satisfy carbon valency.

The substituted nanofibers described above may advantageously be further functionalized. Such compositions include compositions of the formula $$[C_nH_L]A_m$$

where the carbons are surface carbons of a nanofiber, n, L and m are as described above, $$OY, NHY, \overset{O}{\overset{\|}{C}}—OY, \overset{O}{\overset{\|}{C}}—NR'Y, \overset{O}{\overset{\|}{C}}—SY, \overset{O}{\overset{\|}{C}}—Y,$$
$$—CR'_2—OY, —N\!=\!Y \text{ or } C\!=\!Y,$$

Y is an appropriate functional group of a protein, a peptide, an enzyme, an antibody, a nucleotide, an oligonucleotide, an antigen, or an enzyme substrate, enzyme inhibitor or the transition state analog of an enzyme substrate or is selected from R'—OH, R'—NH$_2$, R'SH, R'CHO, R'CN, R'X, R'SiR'$_3$, R'Si$+$OR'$+_y$R'$_{3-y}$, R'Si$+$O—SiR'$_2$$+$OR', R'—R", R'—N—CO, (C$_2$H$_4$O$+_w$H, $+$C$_3$H$_6$O$+_w$H, $+$C$_2$H$_4$O)$_{w—R'}$, $_{(C3}$H$_6$O)$_w$—R' and R', and w is an integer greater than one and less than 200.

The functional nanofibers of structure $$[C_nH_L][R'—R]_m$$

may also be functionalized to produce compositions having the formula $$[C_nH_L][R'—A]_m$$

where n, L, m, R' and A are as defined above.

The particles of the invention also include nanofibers upon which certain cyclic compounds are adsorbed. These include compositions of matter of the formula $$[C_nH_L][X—R_a]_m$$

where n is an integer, L is a number less than 0.1n, m is less than 0.5n, a is zero or a number less than 10, X is a polynuclear aromatic, polyheteronuclear aromatic or metallopolyheteronuclear aromatic moiety and R is as recited above.

Preferred cyclic compounds are planar macrocycles as described on p. 76 of Cotton and Wilkinson, *Advanced Organic Chemistry*. More preferred cyclic compounds for adsorption are porphyrins and phthalocyanines.

The adsorbed cyclic compounds may be functionalized. Such compositions include compounds of the formula $$[C_nH_L][X—A_a]_m$$

where m, n, L, a, X and A are as defined above and the carbons are surface carbons of a substantially cylindrical graphitic nanofiber as described above.

The carbon nanofibers functionalized as described above may be incorporated in a matrix. Preferably, the matrix is an organic polymer (e.g., a thermoset resin such as epoxy, bismaleimide, polyamide, or polyester resin; a thermoplastic resin; a reaction injection molded resin; or an elastomer such as natural rubber, styrene-butadiene rubber, or cis-1,4-polybutadiene); an inorganic polymer (e.g., a polymeric inorganic oxide such as glass), a metal (e.g., lead or copper), or a ceramic material (e.g., Portland cement).

Functional groups may be introduced onto the surface of carbon nanofibers by contacting carbon nanofibers with a strong oxidizing agent for a period of time sufficient to oxidize the surface of said nanofibers and further contacting said nanofibers with a reactant suitable for adding a functional group to the oxidized surface. Preferably, the oxidizing agent is comprised of a solution of an alkali metal chlorate in a strong acid. In other embodiments the alkali metal chlorate is sodium chlorate or potassium chlorate. In preferred embodiments the strong acid used is sulfuric acid. Periods of time sufficient for oxidation are from about 0.5 hours to about 24 hours.

A network of carbon nanofibers are produced by contacting carbon fibrils with an oxidizing agent for a period of time sufficient to oxidize the surface of the carbon nanofibers, contacting the surface-oxidized carbon nanofibers with reactant suitable for adding a functional group to the surface of the carbon nanofibers, and further contacting the surface-functionalized nanofibers with a cross-linking agent effective for producing a network of carbon nanofibers. A preferred cross-linking agent is a polyol, polyamine or polycarboxylic acid.

The functionalized nanofibers may also be in the form of rigid networks of nanofibers. A well-dispersed, three-dimensional network of acid-functionalized nanofibers may, for example, be stabilized by cross-linking the acid groups (inter-fibril) with polyols or polyamines to form a rigid network.

The nanofiber particles also include three-dimensional networks formed by linking functionalized nanofibers of the invention. These complexes include at least two functionalized nanofibers linked by one or more linkers comprising a direct bond or chemical moiety. These networks comprise porous media of remarkably uniform equivalent pore size.

Although the interstices between these nanofibers are irregular in both size and shape, they can be thought of as pores and characterized by the methods used to characterize porous media. The size of the interstices in such networks can be controlled by the concentration and level of dispersion of nanofibers, and the concentration and chain lengths of the cross-linking agents.

Methods for chemical modification of nanofiber surfaces and methods for physically adsorbing species on the surfaces of nanofibers are described so as to provide, in each case, a functional moiety associated with the surface of the nanofiber.

METHODS OF FUNCTIONALIZING NANOFIBERS

The functionalized nanofibers of the invention can be directly prepared by sulfonation, electrophilic addition to deoxygenated nanofiber surfaces or metallation. When arc grown nanofibers are used, they may require extensive purification prior to functionalization. Ebbesen et al. (Nature 367 519 (1994)) give a procedure for such purification.

Preferably, the carbon nanofibers are processed prior to contacting them with the functionalizing agent. Such processing may include dispersing the nanofibers in a solvent. In some instances the carbon nanofibers may then be filtered and dried prior to further contact.

1. SULFONATION

Background techniques are described in March, J. P., *Advanced Organic Chemistry*, 3rd Ed. Wiley, N.Y. 1985; House, H., *Modern Synthetic Reactions*, 2nd Ed., Benjamin/Cummings, Menlo Park, Calif. 1972.

Activated C—H (including aromatic C—H) bonds can be sulfonated using fuming sulfuric acid (oleum), which is a solution of conc. sulfuric acid containing up to 20% $SO_3$. The conventional method is via liquid phase at T~80° C. using oleum; however, activated C—H bonds can also be sulfonated using $SO_3$ in inert, aprotic solvents, or $SO_3$ in the vapor phase. The reaction is:

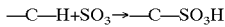

over-reaction results in formation of sulfones, according to the reaction:

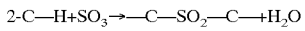

Preparation A

Activation of C—H Bonds Using $SO_3$

Reactions were carried out in the gas phase and in solution without any significant difference in results. The vapor phase reaction was carried out in a horizontal alumina tube reactor heated by a Lindberg furnace. A multi-neck flask containing 20% $SO_3$ in conc. $H_2SO_4$ fitted with gas inlet/outlet tubes was used as the $SO_3$ source.

A weighed sample of fibrils (BN or CC) in a porcelain boat was placed in the 1" tube fitted with a gas inlet; the outlet was connected to a conc. $H_2SO_4$ bubbler trap. Argon was flushed through the reactor for 20 min to remove all air, and the sample was heated to 300° C. for 1 hour to remove residual moisture. After drying, the temperature was adjusted to reaction temperature under argon.

When the desired temperature was stabilized, the $SO_3$ source was connected to the reactor tube and an argon stream was used to carry $SO_3$ vapors into the alumina tube reactor. Reaction was carried out for the desired time at the desired temperature, after which the reactor was cooled under flowing argon. The fibrils were then dried at 90° C. at 5" Hg vacuum to obtain the dry weight gain. Sulfonic acid (—$S_3H$) content was determined by reaction with 0.010N NaOH and back-titration with 0.010N HCl using pH 6.0 as the end point.

The liquid phase reaction was carried out in conc. sulfuric acid containing 20% $SO_3$ in a multi-neck 100 cc flask fitted with a thermometer/temperature controller and a magnetic stirrer. A fibril slurry in conc. $H_2SO_4$ (50) was placed in the flask. The oleum solution (20 cc) was preheated to ~60° C. before addition to the reactor. After reaction, the acid slurry was poured onto cracked ice, and diluted immediately with 1 l DI water. The solids were filtered and washed exhaustively with DI water until there was no change in pH of the wash effluent. Fibrils were dried at 100° C. at 5" Hg vacuum. Due to transfer losses on filtration, accurate weight gains could not be obtained. Results are listed in Table I.

TABLE I

Summary of Reactions

| X. | RUN # | REACT | SAMPLE Wt. g | FIBRIL TYPE | T° C. | TIME | DRY Wt GAIN | SO$_3$H CONC meq/g |
|---|---|---|---|---|---|---|---|---|
| 1A | 118-60A | Vap | 0.20 | CY | 110 | 15 m | 9.3% | 0.50 |
| 1B | 118-61A | Vap | 0.20 | BN | 100 | 30 m | 8.5% | 0.31 |
| 1C | 118-61B | Vap | 0.20 | BN | 65 | 15 m | 4.2% | 0.45 |
| 1D | 118-56A | Liq | 1.2 | CY | 50 | 10 m |  | 0.33 |
| 1E | 118-56B | Liq | 1.0 | CY | 25 | 20 m |  | 0.40 |

There was no significant difference in sulfonic acid content by reaction in the vapor phase or liquid phase. There was a temperature effect. Higher temperature of reaction (vapor phase) gives higher amounts of sulfones. In 118-61B, the 4.2% wt gain agreed with the sulfonic acid content (theoretical was 0.51 meq/g). Runs 60A and 61A had too high a wt gain to be accounted for solely by sulfonic acid content. It was therefore assumed that appreciable amounts of sulfones were also made.

2. ADDITIONS TO OXIDE-FREE FIBRIL SURFACES

Background techniques are described in Urry, G., Elementary *Equilibrium Chemistry of Carbon*, Wiley, N.Y. 1989.

The surface carbons in fibrils behave like graphite, i.e., they are arranged in hexagonal sheets containing both basal plane and edge carbons. While basal plane carbons are relatively inert to chemical attack, edge carbons are reactive and must contain some heteroatom or group to satisfy carbon valency. Fibrils also have surface defect sites which are basically edge carbons and contain heteroatoms or groups.

The most common heteroatoms attached to surface carbons of fibrils are hydrogen, the predominant gaseous component during manufacture; oxygen, due to its high reactivity and because traces of it are very difficult to avoid; and $H_2O$, which is always present due to the catalyst. Pyrolysis at ~1000° C. in a vacuum will deoxygenate the surface in a complex reaction with unknown mechanism. The products are mainly CO and $CO_2$. The resulting fibril surface contains radicals in a $C_1$–$C_4$ alignment which are very reactive to activated olefins. The surface is stable in a vacuum or in the presence of an inert gas, but retains its high reactivity until exposed to a reactive gas. Thus, fibrils can be pyrolized at ~1000° C. in vacuum or inert atmosphere, cooled under these same conditions and reacted with an appropriate molecule at lower temperature to give a stable functional group. Typical examples are:

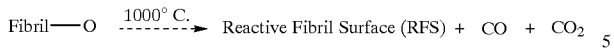

followed by:

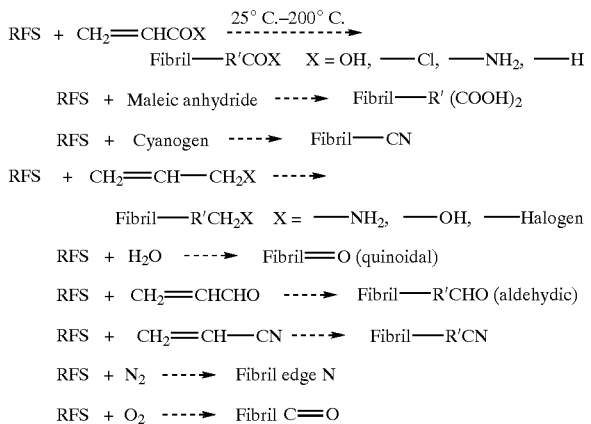

where R' is a hydrocarbon radical (alkyl, aryl, heteroaryl cycloalkyl, aralkyl, heteroaralkyl, etc.)

Preparation B

Preparation of Functionalized Fibrils by Reacting Acrylic Acid with Oxide-Free Fibril Surfaces One hundredth (1/100) of a gram of BN fibrils in a porcelain boat is placed in a horizontal 1" alumina tube fitted with a thermocouple and situated in a Lindberg tube furnace. The ends are fitted with a gas inlet/outlets. The tube is purged with dry, deoxygenated argon for 10 minutes, after which the temperature of the furnace is raised to 300° C. and held for 30 minutes. Thereafter, under a continued flow of argon, the temperature is raised in 100° C. increments to 1000° C., and held there for 16 hours. At the end of that time, the tube is cooled to room temperature (RT) under flowing argon. The flow of argon is then shunted to pass through a multi-neck flask containing neat purified acrylic acid at 50° C. and fitted with gas inlet/outlets. The flow of acrylic acid/argon vapors is continued at RT for 6 hours. At the end of that time, residual unreacted acrylic acid is removed, first by purging with argon, then by vacuum drying at 100° C. at <5" vacuum. The carboxylic acid content is determined by reaction with excess 0.010N NaOH and back-titrating with 0.010N HCl to an endpoint at pH 7.5.

Preparation C

Preparation of Functionalized Fibrils by Reacting Acrylic Acid with Oxide-Free Fibril Surfaces The procedure is repeated in a similar manner to the above procedure, except that the pyrolysis and cool-down are carried out at $10^{-4}$ Torr vacuum. Purified acrylic acid vapors are diluted with argon as in the previous procedure.

Preparation D

Preparation of Functionalized Fibrils by Reacting Maleic Acid with Oxide-Free Fibril Surfaces The procedure is repeated as in Preparation B, except that the reactant at RT is purified maleic anhydride (MAN) which is fed to the reactor by passing argon gas through a molten MAN bath at 80° C.

Preparation E

Preparation of Functionalized Fibrils by Reacting Acryloyl Chloride with Oxide-Free Fibril Surfaces The procedure is repeated as in Preparation B, except that the reactant at RT is purified acryloyl chloride, which is fed to the reactor by passing argon over neat acryloyl chloride at 25° C. Acid chloride content is determined by reaction with excess 0.010N NaOH and back-titration with 0.010N HCl.

Pyrolysis of fibrils in vacuum deoxygenates and dehydrogenates the fibril surface. In a TGA apparatus, pyrolysis at 1000° C. either in vacuum or in a purified Ar flow gives an average wt loss of 3% for 3 samples of BN fibrils. Gas chromatographic analyses detect only CO and $CO_2$, and low molecular weight hydrocarbons. The resulting surface is very reactive and activated olefins such as acrylic acid, acryloyl chloride, acrylamide, acrolein, maleic anhydride, allyl amine, allyl alcohol or allyl halides will react even at room temperature to form clean products containing only that functionality bonded to the activated olefin. Thus, surfaces containing only carboxylic acids are available by reaction with acrylic acid or maleic anhydride; only acid chloride by reaction with acryloyl chloride; only aldehyde from acrolein; only hydroxyl from allyl alcohol; only amine from allyl amine, and only halide from allyl halide.

3. METALLATION

Background techniques are given in March, *Advanced Organic Chemistry*, 3rd ed., p. 545.

Aromatic C—H bonds can be metallated with a variety of organometallic reagents to produce carbon-metal bonds (C—M). M is usually Li, Be, Mg, Al, or Tl; however, other metals can also be used. The simplest reaction is by direct displacement of hydrogen in activated aromatics:

  (1)

The reaction may require additionally, a strong base, such as potassium t-butoxide or chelating diamines. Aprotic solvents are necessary (paraffins, benzene).

  (2)

  (3)

TFA=Trifluoroacetate HTFA=Trifluoroacetic acid

The metallated derivatives are examples of primary singly-functionalized fibrils. However, they can be reacted further to give other primary singly-functionalized fibrils. Some reactions can be carried out sequentially in the same apparatus without isolation of intermediates.

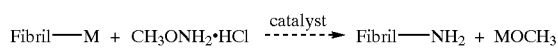

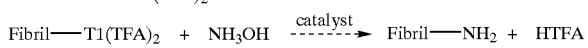

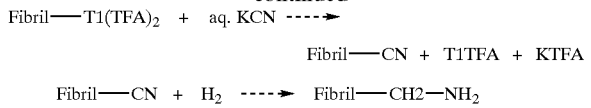

Preparation F

Preparation of Fibril-Li

One hundredth (1/100) of a gram of CC fibrils is placed in a porcelain boat and inserted into a 1" alumina tube reactor which is enclosed in a Lindberg tube furnace. The ends of the tube are fitted with gas inlet/outlets. Under continuous flow of $H_2$, the fibrils are heated to 700° C. for 2 hours to convert any surface oxygenates to C—H bonds. The reactor is then cooled to RT under flowing $H_2$.

The hydrogenated fibrils are transferred with dry, de-oxygenated heptane (with $LiAlH_4$) to a 1 liter multi-neck round bottom flask equipped with a purified argon purging system to remove all air and maintain an inert atmosphere, a condenser, a magnetic stirrer and rubber septum through which liquids can be added by a syringe. Under an argon atmosphere, a 2% solution containing 5 mmol butyllithium in heptane is added by syringe and the slurry stirred under gentle reflux for 4 hours. At the end of that time, the fibrils are separated by gravity filtration in an argon atmosphere glove box and washed several times on the filter with dry, deoxygenated heptane. Fibrils are transferred to a 50 cc r.b. flask fitted with a stopcock and dried under $10^{-4}$ torr vacuum at 50° C. The lithium concentration is determined by reaction of a sample of fibrils with excess 0.010N HCl in DI water and back-titration with 0.010N NaOH to an endpoint at pH 5.0.

Preparation G

Preparation of Fibril-Tl(TFA)$_2$

One hundredth (1/100) of a gram of CC fibrils are hydrogenated as in Preparation E and loaded into the multi-neck flask with HTFA which has been degassed by repeated purging with dry argon. A 5% solution of 5 mmol $Tl(TFA)_3$ in HTFA is added to the flask through the rubber septum and the slurry is stirred at gentle reflux for 6 hours. After reaction, the fibrils are collected and dried as in Preparation A.

Preparation H

Preparation of Fibril-OH (Oxygenated derivative containing only OH functionalization)

One half g of lithiated fibrils prepared in Preparation F are transferred with dry, deoxygenated heptane in an argon-atmosphere glove bag to a 50 cc single neck flask fitted with a stopcock and magnetic stirring bar. The flask is removed from the glove bag and stirred on a magnetic stirrer. The stopcock is then opened to the air and the slurry stirred for 24 hours. At the end of that time, the fibrils are separated by filtration and washed with aqueous MeOH, and dried at 50° C. at 5" vacuum. The concentration of OH groups is determined by reaction with a standardized solution of acetic anhydride in dioxane (0.252 M) at 80° C. to convert the OH groups to acetate esters, in so doing, releasing 1 equivalent of acetic acid/mole of anhydride reacted. The total acid content, free acetic acid and unreacted acetic anhydride, is determined by titration with 0.010N NaOH to an endpoint at pH 7.5.

Preparation I

Preparation of Fibril-NE$_2$

One hundredth (1/100) of a gram of thallated fibrils is prepared as in Preparation G. The fibrils are slurried in dioxane and 0.5 g triphenyl phosphine dissolved in dioxane is added. The slurry is stirred at 50° C. for several minutes, followed by addition at 50° C. of gaseous ammonia for 30 min. The fibrils are then separated by filtration, washed in dioxane, then DI water and dried at 80° C. at 5" vacuum. The amine concentration is determined by reaction with excess acetic anhydride and back-titration of free acetic acid and unreacted anhydride with 0.010N NaOH.

4. DERIVATIZED POLYNUCLEAR AROMATIC, POLYHETERONUCLEAR AROMATIC AND PLANAR MACROCYCLIC COMPOUNDS

The graphitic surfaces of fibrils allow for physical adsorption of aromatic compounds. The attraction is through van der Waals forces. These forces are considerable between multi-ring heteronuclear aromatic compounds and the basal plane carbons of graphitic surfaces. Desorption may occur under conditions where competitive surface adsorption is possible or where the adsorbate has high solubility.

Preparation J

Adsorption of Porphyrins and Phthalocyanines onto Fibrils

The preferred compounds for physical adsorption on fibrils are derivatized porphyrins or phthalocyanines which are known to adsorb strongly on graphite or carbon blacks. Several compounds are available, e.g., a tetracarboxylic acid porphyrin, cobalt (II) phthalocyanine or dilithium phthalocyanine. The latter two can be derivatized to a carboxylic acid form.

The loading capacity of the porphyrin or phthalocyanines can be determined by decoloration of solutions when they are added incrementally. The deep colors of the solutions (deep pink for the tetracarboxylic acid porphyrin in MeOH, dark blue-green for the Co(II) or the dilithium phthalocyanine in acetone or pyridine) are discharged as the molecules are removed by adsorption onto the black surface of the fibrils.

Loading capacities were estimated by this method and the footprints of the derivatives were calculated from their approximate measurements (~140 sq. Angstroms). For an average surface area for fibrils of 250 m$^2$/g, maximum loading will be ~0.3 mmol/g.

The tetracarboxylic acid porphyrin was analyzed by titration. The integrity of the adsorption was tested by color release in aqueous systems at ambient and elevated temperatures.

The fibril slurries were initially mixed (Waring blender) and stirred during loading. Some of the slurries were ultrasounded after color was no longer discharged, but with no effect.

After loading, Runs 169-11, -12, -14 and -19-1 (see Table II) were washed in the same solvent to remove occluded pigment. All gave a continuous faint tint in the wash effluent, so it was difficult to determine the saturation point precisely. Runs 168-18 and -19-2 used the calculated amounts of pigment for loading and were washed only very lightly after loading.

The tetracarboxylic acid porphyrin (from acetone) and the Co phthalocyanine (from pyridine) were loaded onto fibrils for further characterization (Runs 169-18 and -19-2, respectively).

Analysis of Tetracarboxylic Acid Porphyrin

Addition of excess base (pH 11–12) caused an immediate pink coloration in the titrating slurry. While this did not interfere with the titration, it showed that at high pH, porphyrin desorbed. The carboxylic acid concentration was determined by back titration of excess NaOH using Ph 7.5 as end-point. The titration gave a loading of 1.10 meq/g of acid, equivalent to 0.275 meq/g porphyrin.

Analysis of Cobalt or Dilithium Phthalocyanine

The concentrations of these adsorbates were estimated from decoloration experiments only. The point where the blue-green tint did not fade after 30 min was taken as the saturation-point.

A number of substituted polynuclear aromatic or polyheteronuclear aromatic compounds were adsorbed on fibril surfaces. For adhesion, the number of aromatic rings should be greater than two rings per pendant functional group. Thus, substituted anthracenes, phenanthrenes, etc., containing three fused rings, or polyfunctional derivatives containing four or more fused rings can be used in place of the porphyrin or phthalocyanine derivatives. Likewise, substituted aromatic heterocycles such as the quinolines, or multiply substituted heteroaromatics containing four or more rings can be used.

Table II summarizes the results of the loading experiments for the three porphyrin/phthalocyanine derivatives.

TABLE II

Summary of Adsorption Runs

| EX. | RUN # | Adsorbate | Wgt. Fib, g | Solv. | Loading g/g | Form | meq/g Titration |
|---|---|---|---|---|---|---|---|
| 10A | 169-11 | TCAPorph | 19.6 mg | Acet | 0.18 g/g | Acid | na |
| 10B | 169-12 | TCAPorph | 33.3 mg | $H_2O$ | 0.11 | Na Salt | na |
| 10C | 169-14 | DiLiPhth | 119.0 mg | Acet | 0.170 | Li | na |
| 10D | 169-19-1 | CoPhth | 250.0 mg | Pyr | 0.187 | Co | 0.335(cal) |
| 10E | 169-18 | TCAPorph | 1.00 g | Acet | 0.205 | Acid | 1.10(T) |
| 10F | 169-19-2 | CoPhth | 1.40 g | Pyr | 0.172 | Co | 0.303(cal) |

TCAPorph = Tetracarboxylic Acid Porphyrin
(cal)= calculated
DiLiPhth = Dilithium Phthalocyanine
(T)= Titration
CoPhth = Cobalt (II) Phthalocyanine

5. CHLORATE OR NITRIC ACID OXIDATION

Literature on the oxidation of graphite by strong oxidants such as potassium chlorate in conc. sulfuric acid or nitric acid, includes R. N. Smith, *Quarterly Review* 13, 287 (1959); M. J. D. Low, *Chem. Rev.* 60, 267 (1960)). Generally, edge carbons (including defect sites) are attacked to give mixtures of carboxylic acids, phenols and other oxygenated groups. The mechanism is complex involving radical reactions.

Preparation K

Preparation of Carboxylic Acid-Functionalized Fibrils Using Chlorate

The sample of CC fibrils was slurried in conc. $H_2SO_4$ by mixing with a spatula and then transferred to a reactor flask fitted with gas inlet/outlets and an overhead stirrer. With stirring and under a slow flow of argon, the charge of $NaClO_3$ was added in portions at RT over the duration of the run. Chlorine vapors were generated during the entire course of the run and were swept out of the reactor into a aqueous NaOH trap. At the end of the run, the fibril slurry was poured over cracked ice and vacuum filtered. The filter cake was then transferred to a Soxhlet thimble and washed in a Soxhlet extractor with DI water, exchanging fresh water every several hours. Washing was continued until a sample of fibrils, when added to fresh DI water, did not change the pH of the water. The fibrils were then separated by filtration and dried at 100° C. at 5" vacuum overnight.

The carboxylic acid content was determined by reacting a sample with excess 0.010N NaOH and back-titrating with 0.010N HCl to an endpoint at pH 7.5. The results are listed in Table III.

TABLE III

Summary of Direct Oxidation Runs

| Ex. | RUN # | Components, g Fibrils | $NaClO_3$ | cc $H_2SO_4$ | Time hours | Wash Ph | Rec Wgt | Acid, meq/g |
|---|---|---|---|---|---|---|---|---|
| 11A | 168-30 | 10.0 | 8.68 | 450 | 24 | 5.7 | 10.0 | 0.78 |
| 11B | 168-36 | 12.0 | 13.9 | 600 | 24 | 5.9 | 13.7 | 0.75 |

Preparation L
Preparation of Carboxylic Acid-Functionalized Fibrils Using Nitric Acid A weighed sample of fibrils was slurried with nitric acid of the appropriate strength in a bound bottom multi-neck indented reactor flask equipped with an overhead stirrer and a water condenser. With constant stirring, the temperature was adjusted and the reaction carried out for the specified time. Brown fumes were liberated shortly after the temperature exceeded 70° C., regardless of acid strength. After the reaction, the slurry was poured onto cracked ice and diluted with DI water. The slurry was filtered and excess acid removed by washing in a Soxhlet extractor, replacing the reservoir with fresh DI water every several. hours, until a slurried sample gave no change in Ph from DI water. The fibrils were dried at 100° C. at 5" vacuum overnight. A weighed portion of fibrils was reacted with standard 0.010 N NaOH and the carboxylic acid content determined by back-titration with 0.010 N HCl. Surface oxygen content was determined by XPS. Dispersibility in water was tested at 0.1 wt % by mixing in a Waring Blender at high for 2 min. Results are summarized in Table IV.

Angew. Chem. Internat. Edit., (1), 351 (1962) using N,N'-carbonyl diimidazole (CDI) as the acylating agent for esters or amides, and of G. W. Anderson, et al., J. Amer. Chem. Soc. 86, 1839 (1964), using N-Hydroxysuccinimide (NHS) to activate carboxylic acids for amidation were used.

Preparation M

Preparation of Secondary Derivatives of Functionalized Fibrils

N,N'-Carbonyl Diimidazole

Clean, dry, aprotic solvents (e.g., toluene or dioxane) are required for this procedure. Stoichiometric amounts of reagents are sufficient. For esters, the carboxylic acid compound is reacted in an inert atmosphere (argon) in toluene with a stoichiometric amount of CDI dissolved in toluene at R.T. for 2 hours. During this time, $CO_2$ is evolved. After two hours, the alcohol is added along with catalytic amounts of

TABLE IV

Summary of Direct Oxidation Runs

| | COMPONENTS | | | | | | | | |
|---|---|---|---|---|---|---|---|---|---|
| Ex. | Gms. Fibrils | cc Acid | Acid Conc. | Temp. ° C. | Time | Wgt. Loss | COOH meq/g | ESCA, at % C | O | Disp H2O |
| 12A | 1(BN) | 300 | 70% | RT | 24 hr | 0 | <0.1 | 98 | 2 | P |
| 12B | 1(BN) | 300 | 15 | rflx | 48 | <5% | <0.1 | not analyzed | | P |
| 12C | 20(BN) | 1.01 | 70 | rflx | 7 | 25% | 0.8 | not analyzed | | G |
| 12D | 48(BN) | 1.01 | 70 | rflx | 7 | 20% | 0.9 | not analyzed | | G |

P = Poor;
G = Good

6. SECONDARY DERIVATIVES OF FUNCTIONALIZED FIBRILS

Carboxylic Acid-functionalized Fibrils

The number of secondary derivatives which can be prepared from just carboxylic acid is essentially limitless. Alcohols or amines are easily linked to acid to give stable esters or amides. If the alcohol or amine is part of a di- or poly-functional molecule, then linkage through the O— or NH— leaves the other functionalities as pendant groups. Typical examples of secondary reagents are:

| GENERAL FORMULA | PENDANT GROUP | EXAMPLES |
|---|---|---|
| HO—R, R = alkyl, aralkyl, aryl, fluoroethanol, polymer, SiR'$_3$ | R— | Methanol, phenol, trifluorocarbon, OH-terminated Polyester, silanols |
| H$_2$N—R R = same as above | R— | Amines, anilines, fluorinated amines, silylamines, amine terminated polyamides |
| Cl—SiR$_3$ | SiR$_3$— | Chlorosilanes |
| HO—R—OH, R = alkyl, aralkyl, CH$_2$O— | HO— | Ethyleneglycol, PEG, Pentaerythritol, bis-Phenol A |
| H$_2$N—R—NH$_2$, R = alkyl, aralkyl | H$_2$N— | Ethylenediamine, polyethyleneamines |
| X—R—Y, R = alkyl, etc; X = OH or NH$_2$; Y = SH, CN, C = O, CHO, alkene, alkyne, aromatic, heterocycles | Y— | Polyamine amides, Mercaptoethanol |

The reactions can be carried out using any of the methods developed for esterifying or aminating carboxylic acids with alcohols or amines. Of these, the methods of H. A. Staab, Na ethoxide and the reaction continued at 80° C. for 4 hr. For normal alcohols, the yields are quantitative. The reactions are:

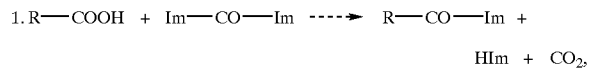

Im = Imidazolide,   HIm = Imidazolide
NaOEt

Amidation of amines occurs uncatalyzed at RT. The first step in the procedure is the same. After evolution of $CO_2$, a stoichiometric amount of amine is added at RT and reacted for 1–2 hours. The reaction is quantitative. The reaction is:

$$R—CO—Im + R'NH_2 \rightarrow R—CO—NHR + HIm \quad (3)$$

N-Hydroxysuccinimide

Activation of carboxylic acids for amination with primary amines occurs through the N-hydroxysuccinamyl ester; carbodiimide is used to tie up the water released as a substituted urea. The NHS ester is then converted at RT to the amide by reaction with primary amine. The reactions are:

$$R—COOH + NHS + CDI \rightarrow R—CONHS + Subst.\ Urea \quad (1)$$

$$R—CONHS + R'NH_2 \rightarrow R—CO—NHR' \quad (2)$$

Silylation

Trialkylsilylchlorides or trialkylsilanols react immediately with acidic H according to:

$$R—COOH + Cl—SiR'_3 \rightarrow R—CO—SiR'_3 + HCl$$

Small amounts of Diaza-1,1,1-bicyclooctane (DABCO) are used as catalysts. Suitable solvents are dioxane and toluene.

Preparation N

Preparation of Ester/Alcohol Derivatives from Carboxylic Acid-Functionalized Fibrils The carboxylic acid functionalized fibrils were prepared as in Preparation K. The carboxylic acid content was 0.75 meq/g. Fibrils were reacted with a stoichiometric amount of CDI in an inert atmosphere with toluene as solvent at R.T. until $CO_2$ evolution ceased. Thereafter, the slurry was reacted at 80° C. with a 10-fold molar excess of polyethyleneglycol (MW 600) and a small amount of NaOEt as catalyst. After two hours reaction, the fibrils were separated by filtration, washed with toluene and dried at 1000° C.

Preparation O

Preparation of Amide/Amine Derivatives from Carboxylic Acid-Functionalized Fibrils (177-041-1)

0.242 g of chlorate-oxidized fibrils (0.62 meq/g) was suspended in 20 ml anhydrous dioxane with stirring in a 100 ml RB flask fitted with a serum stopper. A 20-fold molar excess of N-Hydroxysuccinimide (0.299 g) was added and allowed to dissolve. This was followed by addition of 20-fold molar excess of 1-ethyl-3-(3-dimethylaminopropyl)-carbodiimide (EDAC) (0.510 g), and stirring was continued for 2 hr at RT. At the end of this period stirring was stopped, and the supernatant aspirated and the solids were washed with anhydrous dioxane and MeOH and filtered on a 0.45 micron polysulfone membrane. The solids were washed with additional MeOH on the filter membrane and vacuum-dried until no further weight reduction was observed. Yield of NHS-activated oxidized fibrils was 100% based on the 6% weight gain observed.

100 μl ethylenediamine (en) was added to 10 ml 0.2 M $NaHCO_3$ buffer. An equivalent volume of acetic acid (HOAc) was added to maintain the pH near 8. NHS-activated oxidized fibrils (0.310 g) was added with vigorous stirring and reacted for 1 hr. An additional 300 μl of en and 300 μl HOAc was added for an additional 10 min. The solution was filtered on 0.45 micron polysulfone membrane and washed successively with $NaHCO_3$ buffer, 1% HCl, DI water and EtOH. The solids were dried under vacuo overnight. The HCl salt was converted back to the free amine by reaction with NaOH (177-046-1) for further analysis and reactions.

ESCA was carried out to quantify the amount of N present on the aminated fibrils ($GF/NH_2$). ESCA analysis of 177-046-1 showed 0.90 at % N (177-059). To further assess how much of this N is present as both accessible and reactive amine groups, a derivative was made by the gas phase reaction with pentafluorobenzaldehyde to produce the corresponding Schiff Base linkages with available primary amine groups. ESCA analysis still showed the 0.91 at % N, as expected, and 1.68 at % F. This translates into a 0.34 at % of N present as reactive primary amine on the aminated fibrils (5 F per pentafluorobenzaldehyde molecule). A level of 0.45 at % N would be expected assuming complete reaction with the free ends of each N. The observed level indicates a very high yield from the reaction of N with NHS-activated fibril and confirms the reactivity of the available free amine groups.

At the level of 0.34 at % N present as free amine calculated from the ESCA data, there would be almost complete coverage of the fibrils by the free amine groups allowing coupling of other materials.

Preparation P

Preparation of Silyl Derivative from Carboxylic Acid-Functionalized Fibrils

Acid functionalized fibrils prepared as in Preparation K were slurried in dioxane in an inert atmosphere. With stirring, a stoichiometric amount of chlorotriethyl silane was added and reacted for 0.5 hr, after which several drops of a 5% solution of DABCO in dioxane was added. The system was reacted for an additional hour, after which the fibrils were collected by filtration and washed in dioxane. The fibrils were dried at 100° C. in V" vacuum overnight.

Table V summarizes the secondary derivative preparations. The products were analyzed by ESCA for C, O, N, Si and F surface contents.

TABLE V

Summary of Secondary Derivative Preparations

| | | ESCA ANALYSIS, ATOM % | | | | | |
|---|---|---|---|---|---|---|---|
| REACTANT | PENDANT GROUP | S | C | N | O | Si | F |
| As Grown | — | — | 98.5 | — | 1.5 | — | — |
| Chlorate Oxidized | —COOH, C=O, C—OH | — | 92.4 | — | 7.6 | — | — |
| $H_2N$—$C_2H_4$—$NH_2$ | —$CONHC_2H_4NH_2$ | — | 99.10 | 0.90 | — | — | — |
| | —$CONHC_2H_4N$=$OC_6F_5$ | — | 97.41 | 0.91 | — | — | 1.68 |

Preparation Q

Preparation of Silyl Derivative from Carboxylic Acid-Functionalized Fibrils

Acid functionalized fibrils prepared as in Preparation K are slurried in dioxane in an inert atmosphere. With stirring, a stoichiometric amount of chlorotriethyl silane is added and reacted for 0.5 hr, after which several drops of a 5% solution of DABCO in dioxane is added. The system is reacted for an additional hour, after which the fibrils are collected by filtration and washed in dioxane. The fibrils are dried at 100° C. in 5" vacuum overnight.

Table VI summarizes the secondary derivative preparations. Products are analyzed by ESCA. The analysis confirms the incorporation of the desired pendant groups. The products are analyzed by ESCA for C, O, N, Si and F surface contents.

TABLE VI

Summary of Secondary Derivative Preparations

| | | ESCA ANALYSIS, ATOM % | | | | | |
|---|---|---|---|---|---|---|---|
| REACTANT | PENDANT GROUP | S | C | N | O | Si | F |
| $CF_3CH_2OH$ | —$COOCH_2CF_3$ | NOT ANALYZED | | | | | |
| PolyEG-600 | —CO—($OC_2H_4O$—)H | NOT ANALYZED | | | | | |

TABLE VI-continued

Summary of Secondary Derivative Preparations

| REACTANT | PENDANT GROUP | ESCA ANALYSIS, ATOM % | | | | |
|---|---|---|---|---|---|---|
| | | S | C | N | O | Si | F |
| HO—C$_2$H$_4$—SH | —COOC$_2$H$_4$SH | | | | | |
| Cl—SiEt$_3$ | —COSiEt$_3$ | | | | | |

Sulfonic Acid-Functionalized Fibrils

Aryl sulfonic acids, as prepared in Preparation A can be further reacted to yield secondary derivatives. Sulfonic acids can be reduced to mercaptans by LiAlH$_4$ or the combination of triphenyl phosphine and iodine (March, J. P., p. 1107). They can also be converted to sulfonate esters by reaction with dialkyl ethers, i.e., Fibril-SO$_3$H+R—O—R→Fibril-SO$_2$OR+ROH

Fibrils Functionalized by Electrophilic Addition to Oxygen-Free Fibril Surfaces or by Metallization

The primary products obtainable by addition of activated electrophiles to oxygen-free fibril surfaces have pendant —COOH, —COCl, —CN, —CH$_2$NH$_2$, —CH$_2$OH, —CH$_2$— Halogen, or HC=O. These can be converted to secondary derivatives by the following:

Fibril-COOH→see above.

Fibril-COCl(acid chloride)+HO—R—Y→F—COO—R—Y (Sec. ⅓)

Fibril-COCl+NH$_2$—R—Y→F—CONH—R—Y

Fibril-CN+H$_2$→F—CH$_2$—NH$_2$

Fibril-CH$_2$NH$_2$+HOOC—R—Y→F—CH$_2$NHCO—R—Y

Fibril-CH$_2$NH$_2$+O=CR—R'Y→F—CH$_2$N=CR—R'—Y

Fibril-CH$_{20}$H+O(COR—Y)$_2$→F—CH$_2$OCOR—Y

Fibril-CH$_2$OH+HOOC—R—Y→F—CH$_2$OCOR—Y

Fibril-CH$_2$-Halogen+Y$^-$→F—CH$_2$-Y+X$^-$Y$^-$=NCO$^-$, —OR$^-$

Fibril-C=O+H$_2$N—R—Y→F—C=N—R—Y

Fibrils Functionalized by Adsorption of Polynuclear or Polyheteronuclear Aromatic or Planar Macrocyclic Compounds

Dilithium Phthalocyanine

In general, the two Li$^+$ ions are displaced from the phthalocyanine (Pc) group by most metal (particularly multi-valent) complexes. Therefore, displacement of the Li$^+$ ions with a metal ion bonded with non-labile ligands is a method of putting stable functional groups onto fibril surfaces. Nearly all transition metal complexes will displace Li$^+$ from Pc to form a stable, non-labile chelate. The point is then to couple this metal with a suitable ligand.

Cobalt (II) Phthalocyanine

Cobalt (II) complexes are particularly suited for this. Co$^{++}$ ion can be substituted for the two Li$^+$ ions to form a very stable chelate. The Co$^{++}$ ion can then be coordinated to a ligand such as nicotinic acid, which contains a pyridine ring with a pendant carboxylic acid group and which is known to bond preferentially to the pyridine group. In the presence of excess nicotinic acid, Co(II)Pc can be electrochemically oxidized to Co(III)Pc, forming a non-labile complex with the pyridine moiety of nicotinic acid. Thus, the free carboxylic acid group of the nicotinic acid ligand is firmly attached to the fibril surface.

Other suitable ligands are the aminopyridines or ethylenediamine (pendant NH$_2$), mercaptopyridine (SH), or other polyfunctional ligands containing either an amino- or pyridyl- moiety on one end, and any desirable function on the other.

7. 3-DIMENSIONAL STRUCTURES

The oxidized fibrils are more easily dispersed in aqueous media than unoxidized fibrils. Stable, porous 3-dimensional structures with meso- and macropores (pores>2 nm) are very useful as catalysts or chromatography supports. Since fibrils can be dispersed on an individualized basis, a well-dispersed sample which is stabilized by cross-links allows one to construct such a support. Functionalized fibrils are ideal for this application since they are easily dispersed in aqueous or polar media and the functionality provides cross-link points. Additionally, the functionality provides points to support the catalytic or chromatographic sites. The end result is a rigid, 3-dimensional structure with its total surface area accessible with functional sites on which to support the active agent.

Typical applications for these supports in catalysis include their use as a highly porous support for metal catalysts laid down by impregnation, e.g., precious metal hydrogenation catalysts. Moreover, the ability to anchor molecular catalysts by tether to the support via the functionality combined with the very high porosity of the structure allows one to carry out homogeneous reactions in a heterogeneous manner. The tethered molecular catalyst is essentially dangling in a continuous liquid phase, similar to a homogeneous reactor, in which it can make use of the advantages in selectivities and rates that go along with homogeneous reactions. However, being tethered to the solid support allows easy separation and recovery of the active, and in many cases, very expensive catalyst.

These stable, rigid structures also permits carrying out heretofore very difficult reactions, such as asymmetric syntheses or affinity chromatography by attaching a suitable enantiomeric catalyst or selective substrate to the support. Derivatization through Metallo-Pc or Metallo-porphyrin complexes also allows for retrieval of the ligand bonded to the metal ion, and furthermore, any molecule which is bonded to the ligand through the secondary derivatives. For example, in the case where the 3-dimensional structure of functionalized fibrils is an electrode, or part of an electrode, and the functionalization has resulted from adsorption of Co(II)Pc, electrochemical oxidation of Co(II) to Co(III) in the presence of nicotinic acid will produce a non-labile Co(III)-pyridyl complex with a carboxylic acid as the pendent group. Attaching a suitable antigen, antibody, catalytic antibody, or other site-specific trapping agent will permit selective separations of molecules (affinity chromatography) which are otherwise very difficult to achieve. After washing the electrode to remove occluded material, the Co(III) complex containing the target molecule can be electrochemically reduced to recover the labile Co(II) complex. The ligand on Co(II) containing the target molecule can then be recovered by mass action substitution of the labile Co(II) ligand, thereby effecting a separation and recovery of molecules which are otherwise very difficult or expensive to perform (e.g., chiral drugs).

Another example of 3-dimensional structures are fibril-ceramic composites.

As illustrated by the foregoing description and examples, the invention has application in the formulation of a wide variety of functionalized nanofibers.

The terms and expressions which have been employed are used as terms of description and not of limitations, and there is no intention in the use of such terms or expressions of excluding any equivalents of the features shown and described as portions thereof, its being recognized that various modifications are possible within the scope of the invention.

DESCRIPTION OF PREFERRED EMBODIMENTS OF THE INVENTION

Nanofibers are prepared with varying surface treatments. Two systems for wet oxidation of nanofibers have been demonstrated: chlorate oxidation and nitric acid oxidation. Within these, acid strength, reaction time and temperature can be varied.

The creation of redox groups on the surface of nanofibers is particularly preferred. Quinones and hydroquinones may be deposited by adsorption or precipitation from appropriate solvents in the presence of nanofibers. More exotic structures and methods of surface coating may be obtained with fibrils before they are assembled into electrodes.

Electrodes are assembled by simple filtration of slurries of the treated nanofibers. Thickness is controlled by the quantity of material used and the geometry, assuming the density has been anticipated based on experience. It may be necessary to adjust thickness to get self-supporting felts. Composite electrodes from slurries of nanofibers and conventional fibers may be used.

The electrodes are advantageously characterized by cyclic voltammetry, conductivity and DC capacitance measurement.

To prepare a Faradaic electrode with redox potential near zero (NHE), surface groups are introduced that have a redox potential near zero. Such surface groups advantageously include disulfides and quaternary amines. The sulfides or appropriate amines are advantageously adsorped or precipitated in the presence of fibrils, before assembly into mats.

EXAMPLES

Instrumentation

Balance, Ohaus Model E120.
Frequency Response Analyzer (FRA), Schlumberger Model 1250.
Potentiostat, EG&G Model 273.
Digital Multimeter, Keithley Model 197.
RCL Motor, Philips PM6303.

Example 1

A weighed sample of fibrils was slurried with nitric acid of the appropriate strength in a bound bottom multi-neck indented reactor flask equipped with an overhead stirrer and a water condenser. With constant stirring, the temperature was adjusted and the reaction carried out for the specified time. Brown fumes were liberated shortly after the temperature exceeded 70° C., regardless of acid strength. After the reaction, the slurry was poured onto cracked ice and diluted with deionized water. The slurry was filtered and excess acid removed by washing in a Soxhlet extractor, replacing the reservoir with fresh deionized water every several hours, until a slurried sample gave no change in pH from deionized water. The fibrils were dried at 1000° C. at 5" vacuum overnight.

1.3 g of the dried fibrils were slurried in fresh deionized water and filtered on a 7 cm diameter filter paper to form a thin sheet of the oxidized fibrils.

The fibril sheet material, labeled 170-42, was soaked in deionized water and then punched into 0.73 inch diameter disks. These were dried at 85° C. for approximately one hour and weighed. Their average weight was 0.074 g. The disks were soaked overnight in 38 weight percent sulfuric acid held at approximately 85° C. and then kept in the acid solution at 25° C. until cell assembly.

Single-cell electrochemical capacitors were fabricated using pairs of these disks. Capacitors were evaluated in a flooded condition using a 0.001 inch thick porous separator. Three separate single-cell capacitors were assembled from the punched disks and tested.

Capacitance was measured using both a 10 ohm and a 100 ohm charging resistor in accordance with test methods described in DOD-C-29501.

ESR was measured in accordance with DOD-C-29501 at 1 kHz with 0-V bias. Leakage current also was measured using this procedure.

The complex impedance of each test capacitor was measured at room temperature with a 10 mV ac signal using the FRA and potentiostat. Measurements were made at 0-V and 1-V bias over the frequency range $65 \times 10^3$ Hz to approximately $1 \times 10^{-3}$ Hz. This frequency range spanned the region where capacitive behavior was exhibited.

Capacitance and ESR measurements of each test device were made initially after assembly and then periodically throughout the time each device was evaluated. Capacitance generally increased with time—ESR remained stable. Test results are given in Table VII. Sequential measurements are listed in the Table.

TABLE VII

Capacitance, ESR, and Leakage Current Values

| Cap ID | ESR (ohms) | $C_{10}$ (F) | $C_{100}$ (F) | $I_L$ (uA) |
|---|---|---|---|---|
| a | 0.106 | 2.01 | 2.05 | 707 |
|   | 0.103 | 2.33 | | |
|   |       | 2.45 | | |
| b | 0.194 | 2.02 | 2.13 | 649 |
|   | 0.197 | 2.52 | 2.47 | |
| c | 0.119 | 2.04 | 2.00 | 650 |
|   |       | 2.73 | | |
|   | 0.165 | 2.86 | 2.84 | |

Figure 5:
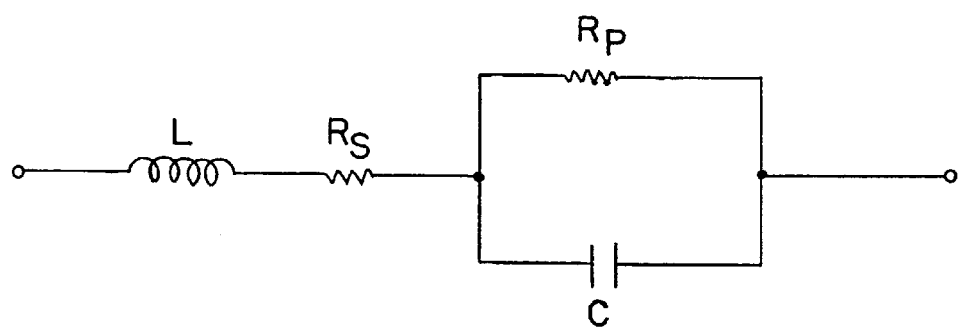
FIG. 5 is an equivalent circuit diagram representing the electrical performances of the capacitor.

An equivalent circuit model was derived for test capacitor "a" using the impedance data. FIG. 5 shows a single-time-constant RC model with a shunt resistor and a series inductor. Circuit element values are listed in Table VIII.

TABLE VIII

CIRCUIT ELEMENT PARAMETERS (capacitor a)
(units: uH, ohms, F)

| Bias (V) | L | $R_s$ | $R_p$ | C |
|---|---|---|---|---|
| 0.0 | .144 | .112 | 586 | 3.23 |
| 1.0 | .145 | .103 | 233 | 1.54 |

The low-frequency, 0-V bias capacitance of the present test capacitor was approximately 3.23 F, giving an electrode capacitance of approximately 6.4 F. Since the electrode mass was 0.074 g, the material had a low-frequency specific capacitance of approximately 86 F/g. Significantly, this device exhibited very ideal capacitance behavior up to frequencies of about 2 Hz for 0-V bias and up, to about 4 Hz for 1 V bias.

A drift in charging capacitance with time was observed for all three test devices. The direction was consistently upward, and amounted to about 40% for device "c".

What is claimed is:

1. A capacitor comprising:
   a first electrode comprising nanofibers having a surface area greater than about 100 m²/gm;
   a second electrode having a surface area greater than about 100 m²/gm and having a redox potential different from said first electrode; and
   an electrode separator disposed between said electrodes, said electrode separator comprising an electrically non-conductive and ionically conductive material,
   wherein redox reactions occur only at surfaces of said first and second electrodes.

2. The capacitor of claim 1 wherein said nanofibers are substantially free of micropores.

3. The capacitor of claim 1 wherein said micropores contribute not more than 5% of the surface area.

4. The capacitor of claim 1 wherein the nanofibers in said first electrode are functionalized.

5. The capacitor of claim 4 wherein the nanofibers in said first electrode are functionalized with one or more functional groups selected from the group consisting of quinone, hydroquinone, quarternized aromatic amines, mercaptans and disulfides.

6. The capacitor of claim 5, wherein the functional groups are contained in a ladder polymer of the formula

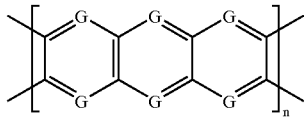

wherein G is CH or N.
or are a graphenic analogue of one or more of

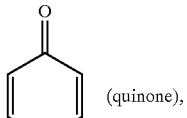
(quinone),

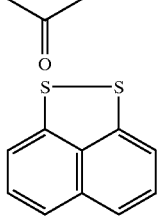
(1.8 napthaline disulfide) and

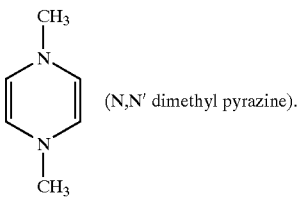
(N,N' dimethyl pyrazine).

7. The capacitor of claim 6 wherein the nanofibers are carbon nanofibers which are substantially cylindrical and have a substantially constant diameter and have graphitic layers concentric with the nanofiber axis, said nanofibers being substantially free of pyrolytically deposited carbon.

8. The capacitor of claim 6 wherein said nanofibers are coated with a thin layer of a pyrolyzed carbonaceous polymer.

9. The capacitor of claim 8 wherein said coating layer comprises one or more polymers selected from the group consisting of phenol-formaldehyde polymers, polyacrylonitrile, styrene DVB, cellulosic polymers and H-resin.

10. The capacitor of claim 6 wherein said nanofibers are intertwined and interconnected to form a rigid porous carbon structure.

11. The capacitor of claim 6 wherein said second electrode has a redox voltage different from said first electrode.

12. The capacitor of claim 11 wherein the redox voltage of said second electrode is near zero (NHE).

13. The capacitor of claim 11 wherein said nanofibers are carbon nanofibers which are substantially cylindrical, have a substantially constant diameter, are comprised of graphitic layers concentric with the longitudinal axis of said nanofiber and are substantially free of pyrolitically deposited carbon.

14. The capacitor of claim 11 wherein said nanofibers are coated with a thin layer of a pyrolyzed carbonaceous polymer.

15. The capacitor of claim 14 wherein said coating layer comprises one or more polymers selected from the group consisting of phenol-formaldehyde polymers, polyacrylonitrile, styrene DVB, cellulosic polymers and H-resin.

16. The capacitor of claim 11 wherein said nanofibers are intertwined and interconnected to form a rigid porous carbon structure.

* * * * *